United States Patent [19]

Smith

[11] Patent Number: 5,206,800

[45] Date of Patent: Apr. 27, 1993

US005206800A

[54] ZERO VOLTAGE SWITCHING POWER CONVERTER WITH SECONDARY SIDE REGULATION

[75] Inventor: David A. Smith, Kowloon, Hong Kong

[73] Assignee: Astec International, Ltd., Hong Kong, Hong Kong

[21] Appl. No.: 892,226

[22] Filed: Jun. 2, 1992

Related U.S. Application Data

[63] Continuation-in-part of Ser. No. 668,587, Mar. 13, 1991, Pat. No. 5,173,846.

[51] Int. Cl.[5] .......................................... H02M 3/335
[52] U.S. Cl. ...................................... 363/21; 363/97; 363/131
[58] Field of Search .................. 363/20, 21, 86, 89, 363/95, 97, 131

[56] References Cited

U.S. PATENT DOCUMENTS

| | | | |
|---|---|---|---|
| 4,417,153 | 11/1983 | Onodera et al. | 363/20 |
| 4,441,146 | 4/1984 | Vinciarelli | 363/20 |
| 4,559,590 | 12/1985 | Davidson | 363/21 |
| 4,618,919 | 10/1986 | Martin | 363/21 |
| 4,809,148 | 2/1989 | Barn | 363/131 |
| 4,870,554 | 9/1989 | Smith | 363/131 |
| 4,870,555 | 9/1989 | White | 363/21 |
| 4,959,764 | 9/1990 | Bassett | 363/20 |
| 4,975,821 | 12/1990 | Lethellier | 363/97 |

OTHER PUBLICATIONS

Carsten; "High Power SMPS Require Intrinsic Reliability"; Mar. 1982 PCI Proceedings; pp. 456–471.
Carsten; "Design Tricks, Techniques, and Tribulations At High Conversion Frequencies"; Apr. 1987 HPFC Proceedings; pp. 139–152.
UNITRODE Datasheet For UCI1825 High Speed PWM Controller; Linear IC's Data And Applications Handbook; Apr. 1990; pp. 4–120 to 4–126.
Data Sheet for the "ASTEC AS431, Precision Adjustable Shunt Reference,"ASTEC Semiconductor, Apr. 1990, pp. 1–4.
S. Contreras, "ASTEC AS431 Application Note,"ASTEC Semiconductor, Sep. 1990, pp. 1–3.

*Primary Examiner*—Steven L. Stephan
*Assistant Examiner*—Jeffrey Sterrett
*Attorney, Agent, or Firm*—McCubbrey, Bartels, Meyer & Ward

[57] ABSTRACT

A circuit for utilizing the magnetizing current in the transformer of a converter to reset the transformer's core and to provide a zero-voltage-switching condition on the converter's primary switch and to regulate the output voltage is disclosed. The power converter includes a transformer having a primary winding and a secondary winding, the secondary winding being coupled to an output load and a primary switch connected in series between the primary winding and a voltage source. The closing of the primary switch causes energy to be stored in the transformer and the opening of the primary switch causes the energy to be released from the transformer. The utilization circuit includes a series combination of a storage capacitor and a first switch coupled in parallel with one of the transformer's windings to capture the energy released from the transformer. The captured energy is used to reset the transformer's core and to create a zero voltage switching condition across the primary switch. A second switch means is connected in series with the secondary winding of the transformer and is operated to prevent the loading effects of the secondary from interrupting the creation of the zero-voltage switching condition. A secondary side regulation circuit is included to both regulate the output voltage and to prevent the loading effects of the secondary circuit from interfering with zero-voltage switching in the primary circuit.

13 Claims, 15 Drawing Sheets

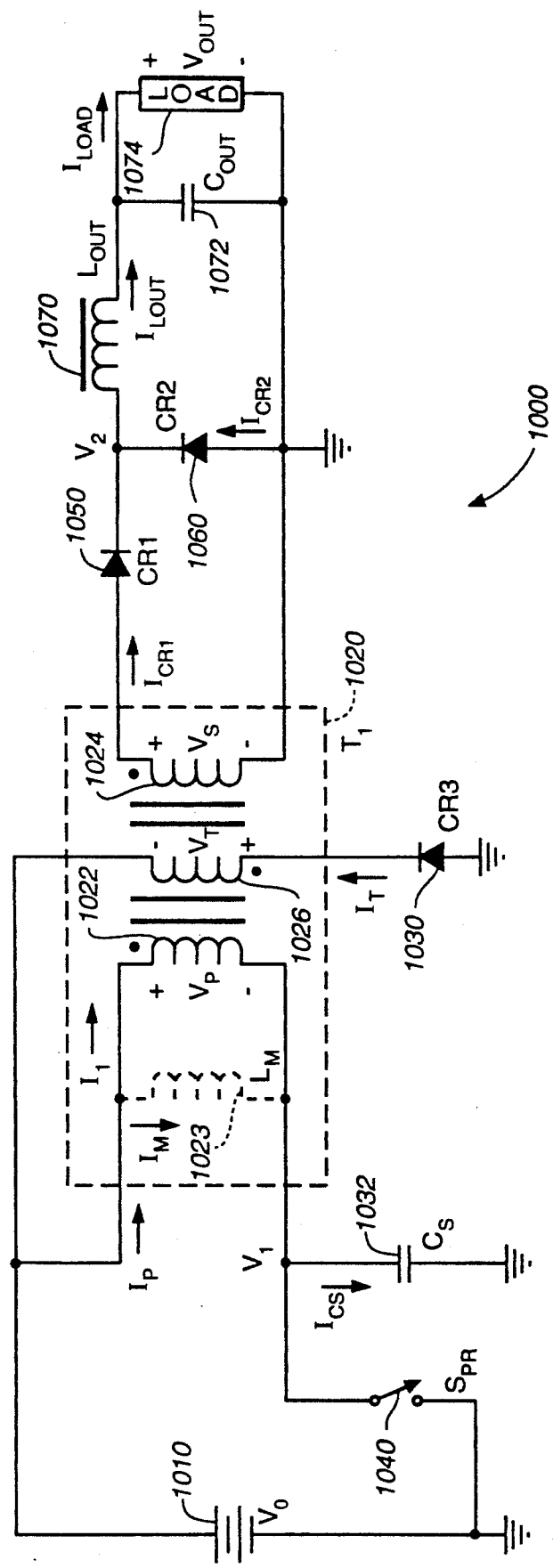
FIG._1
*(PRIOR ART)*

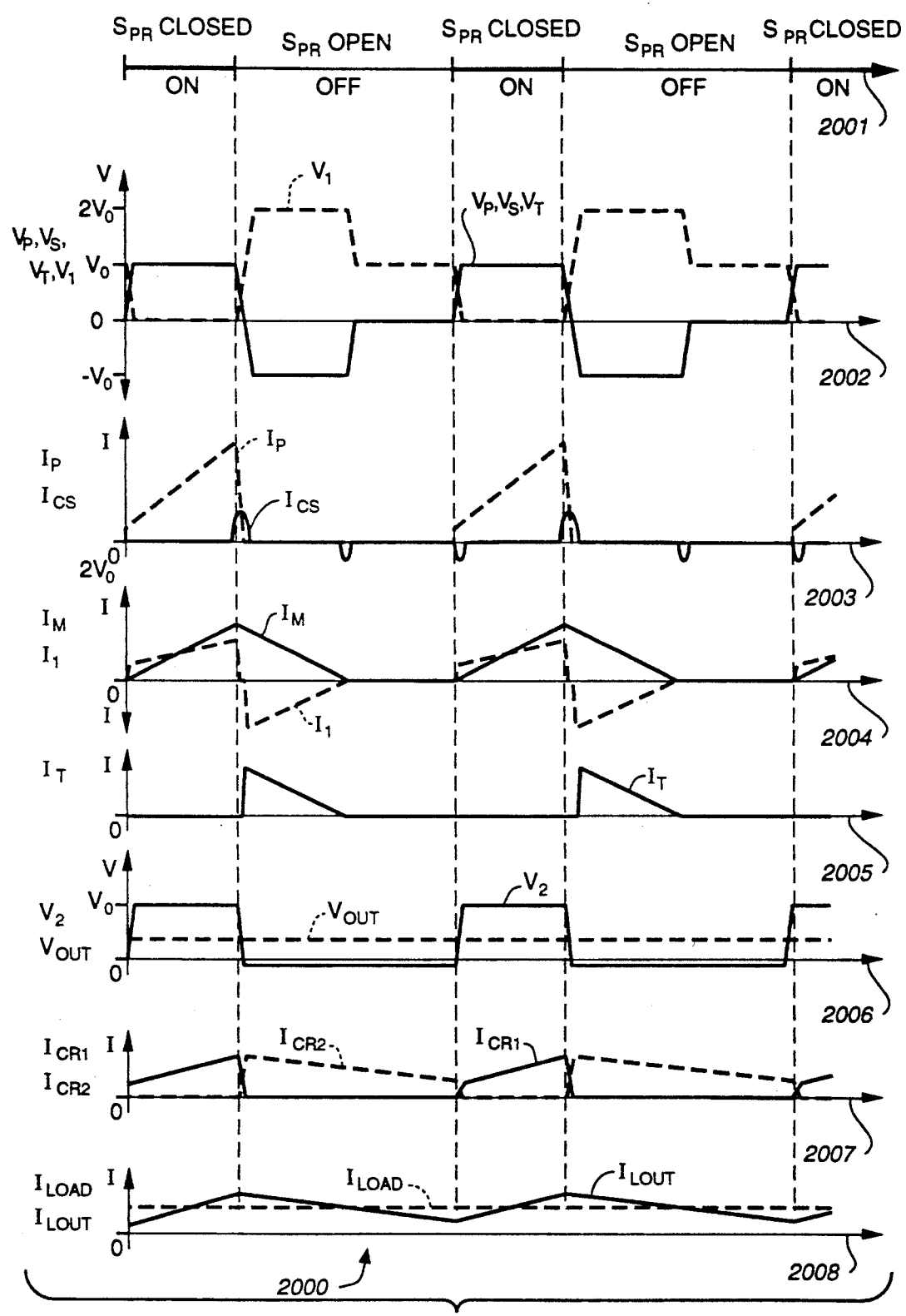
FIG._2
*(PRIOR ART)*

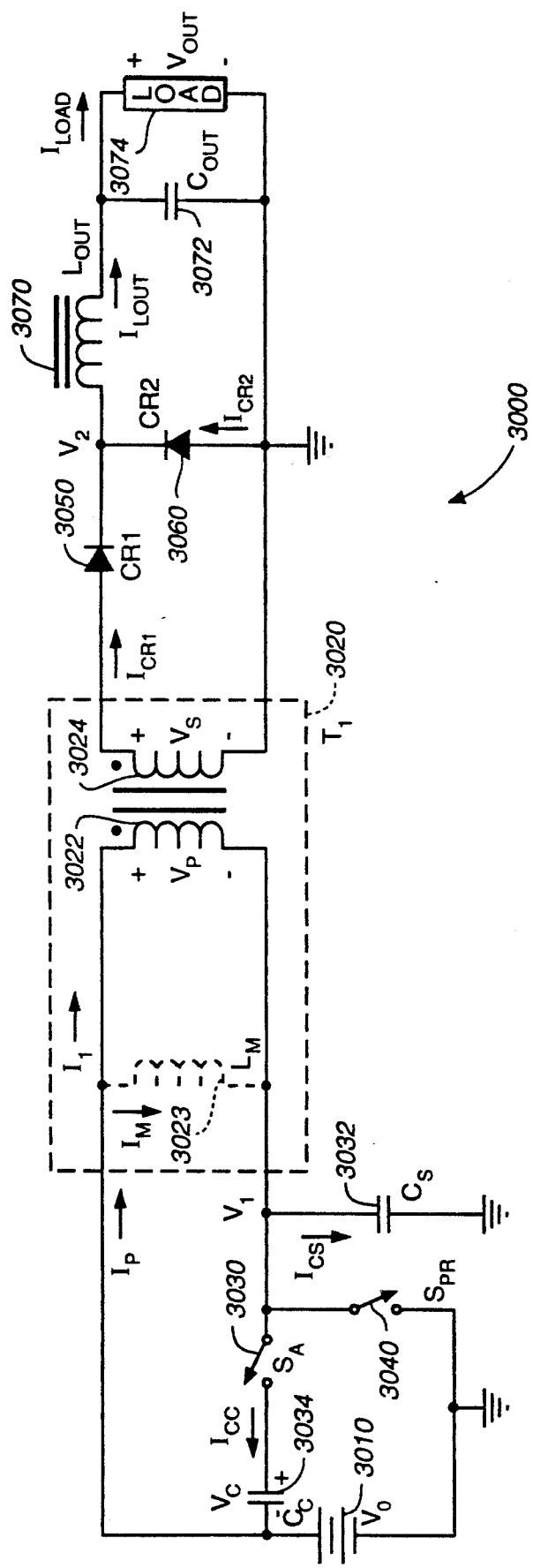
FIG._3 (PRIOR ART)

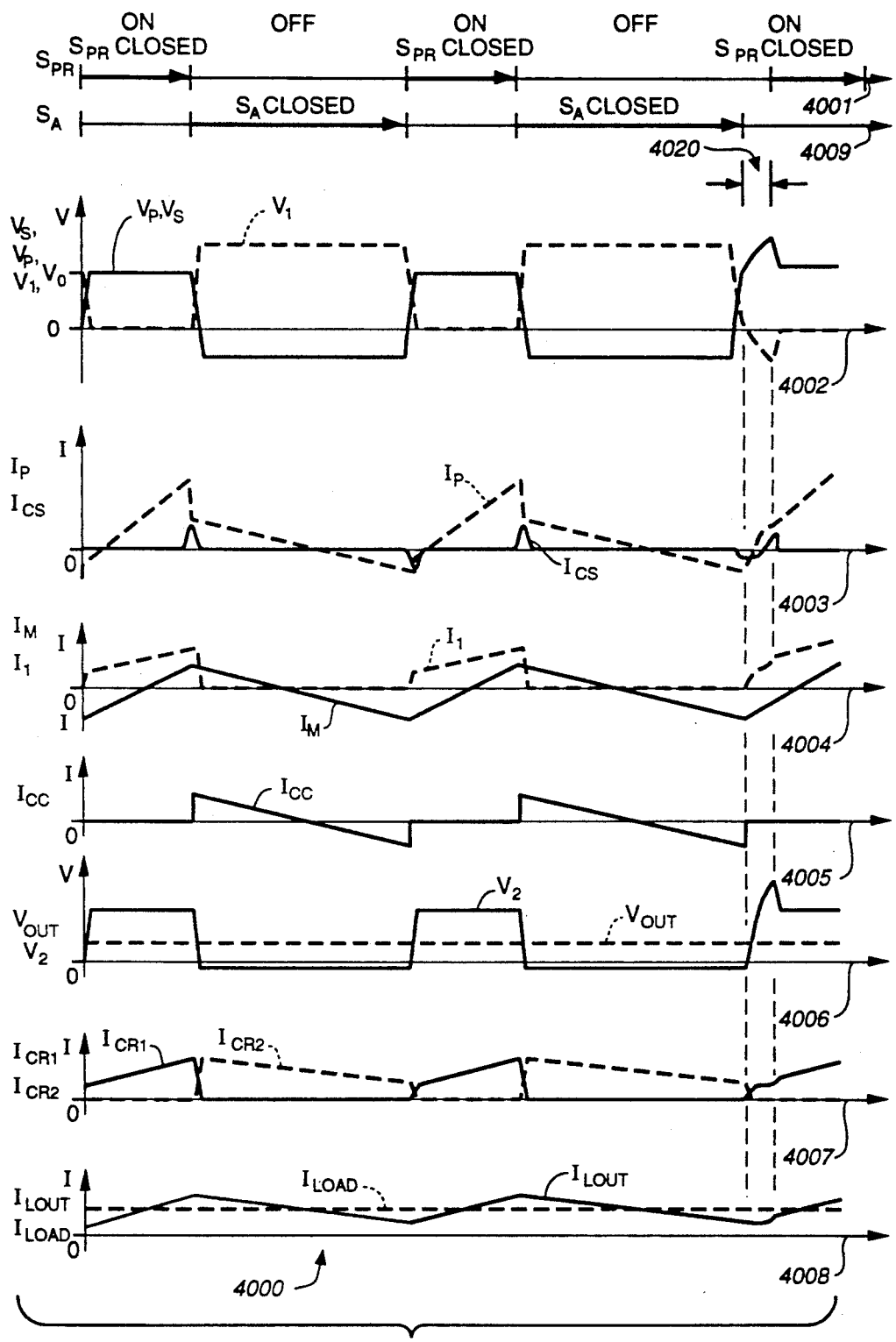
FIG._4

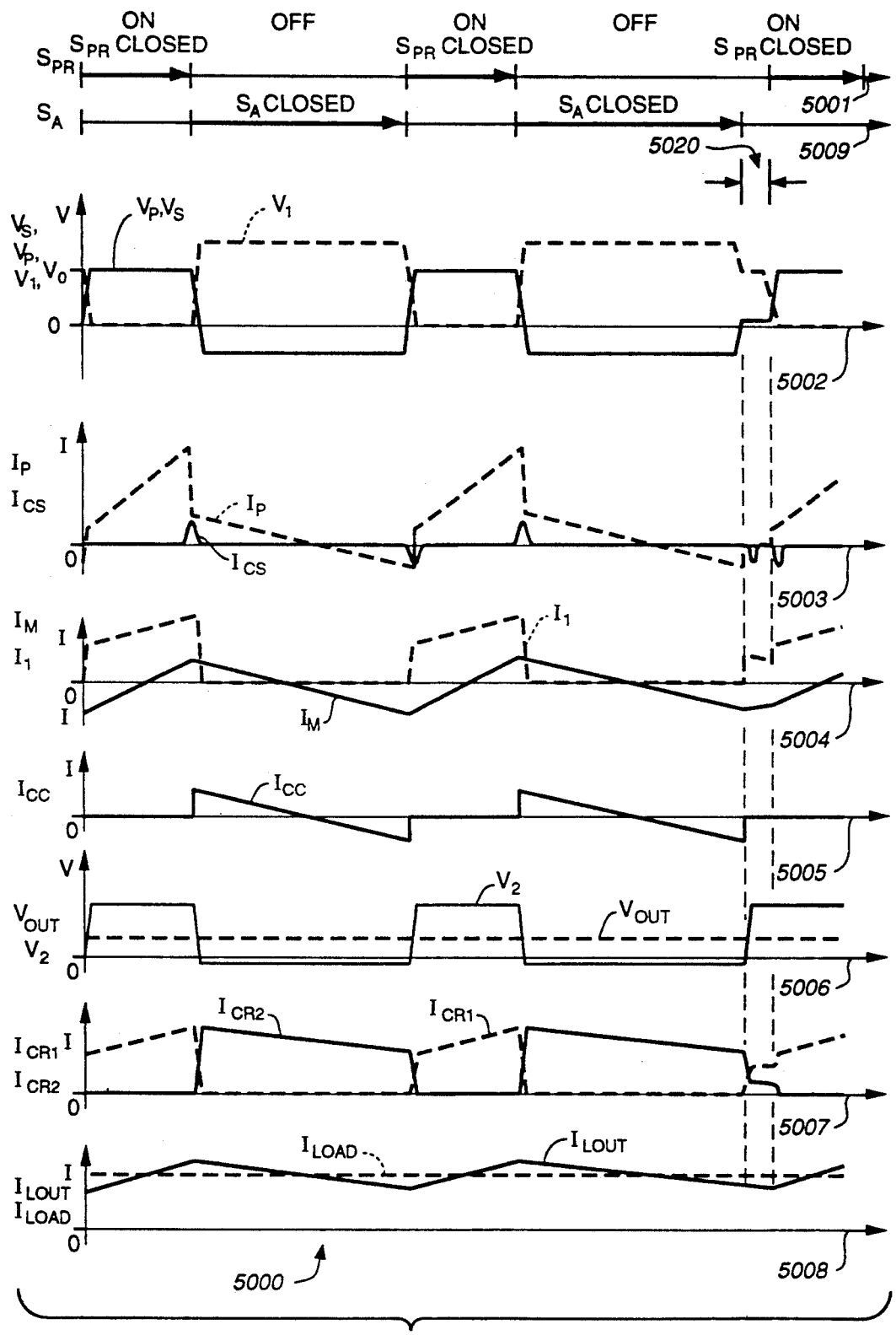
FIG._5

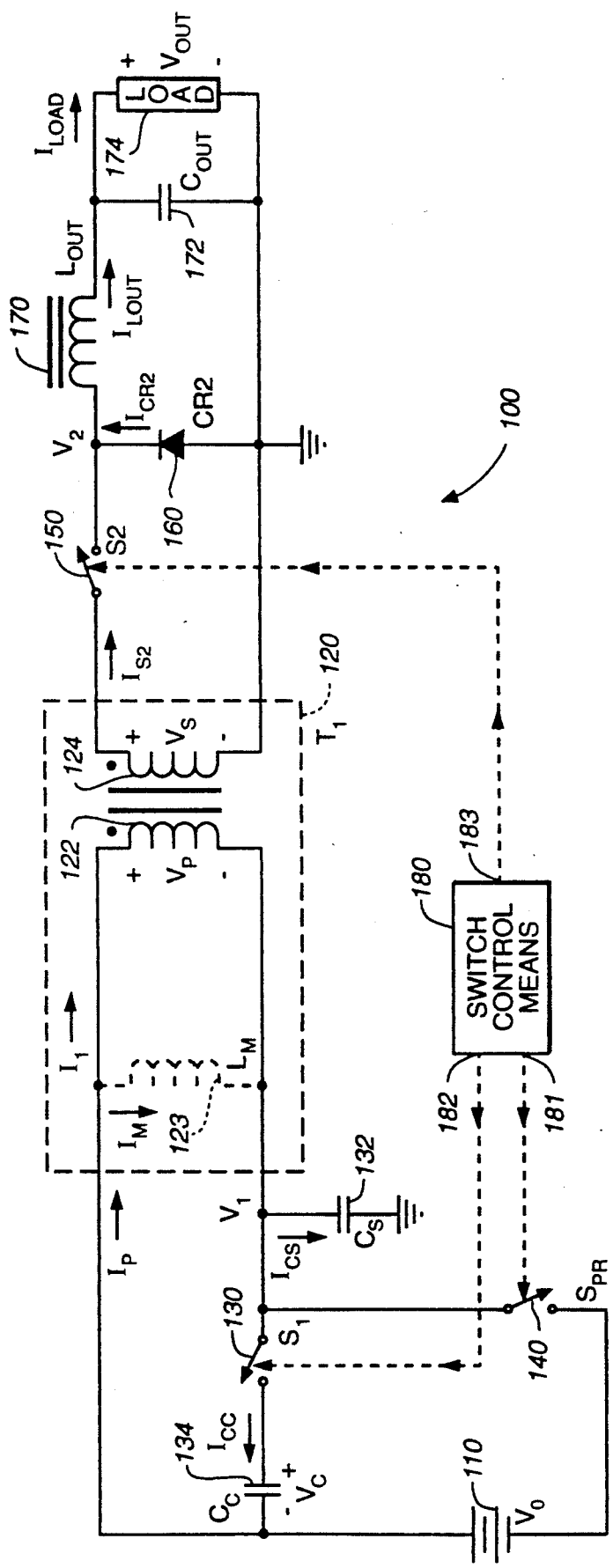
FIG._6

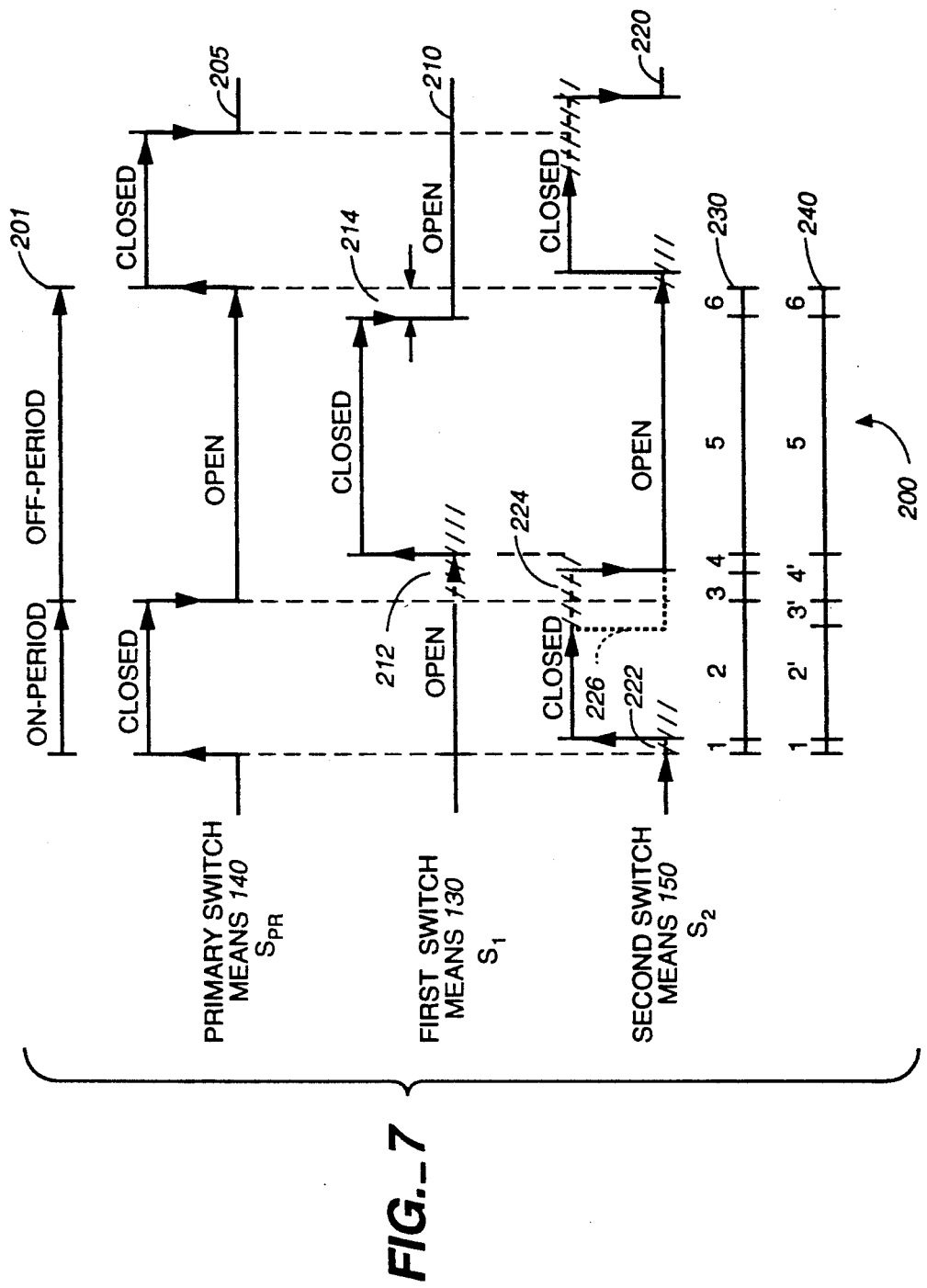
FIG._7

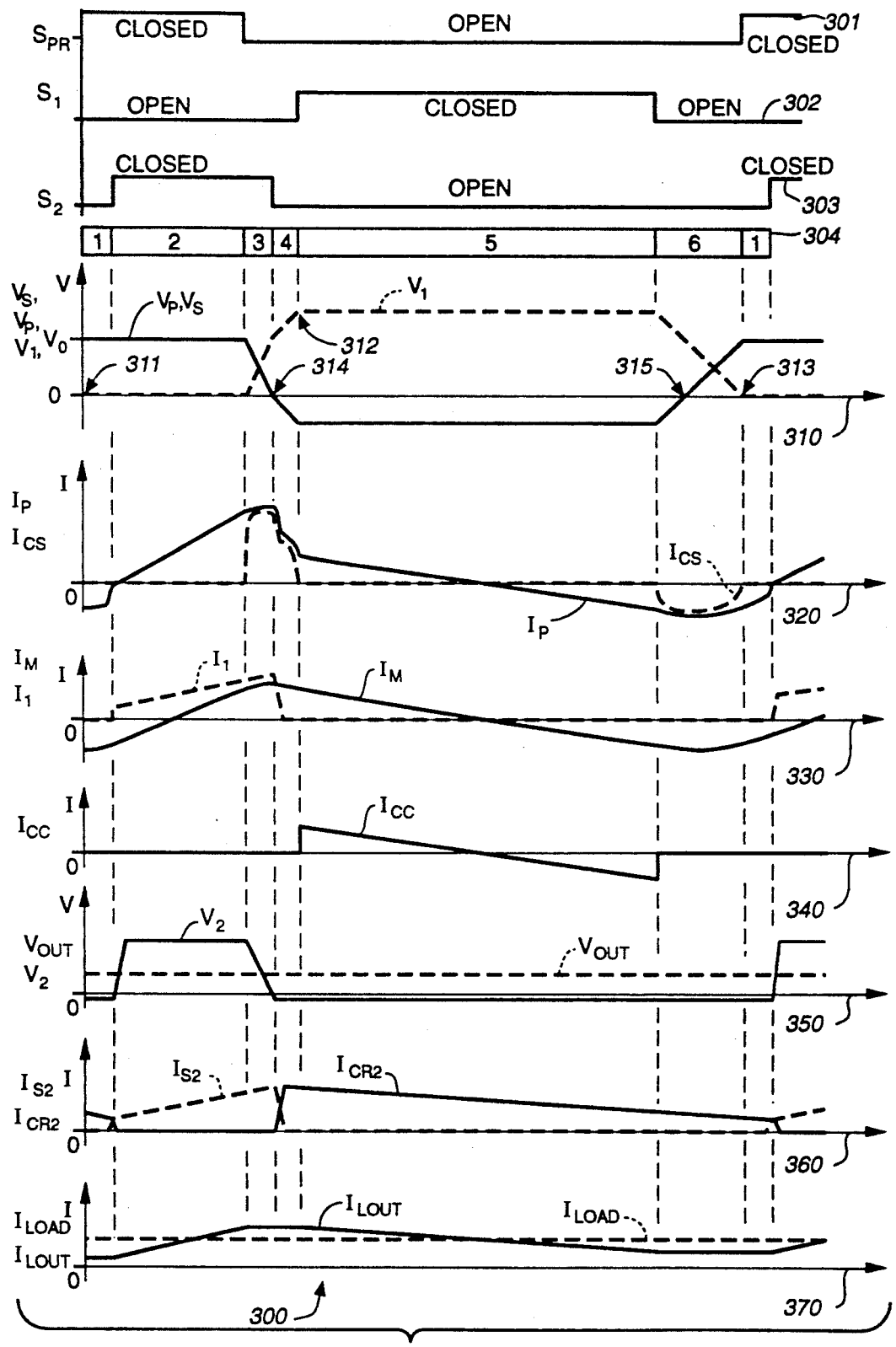
FIG._8

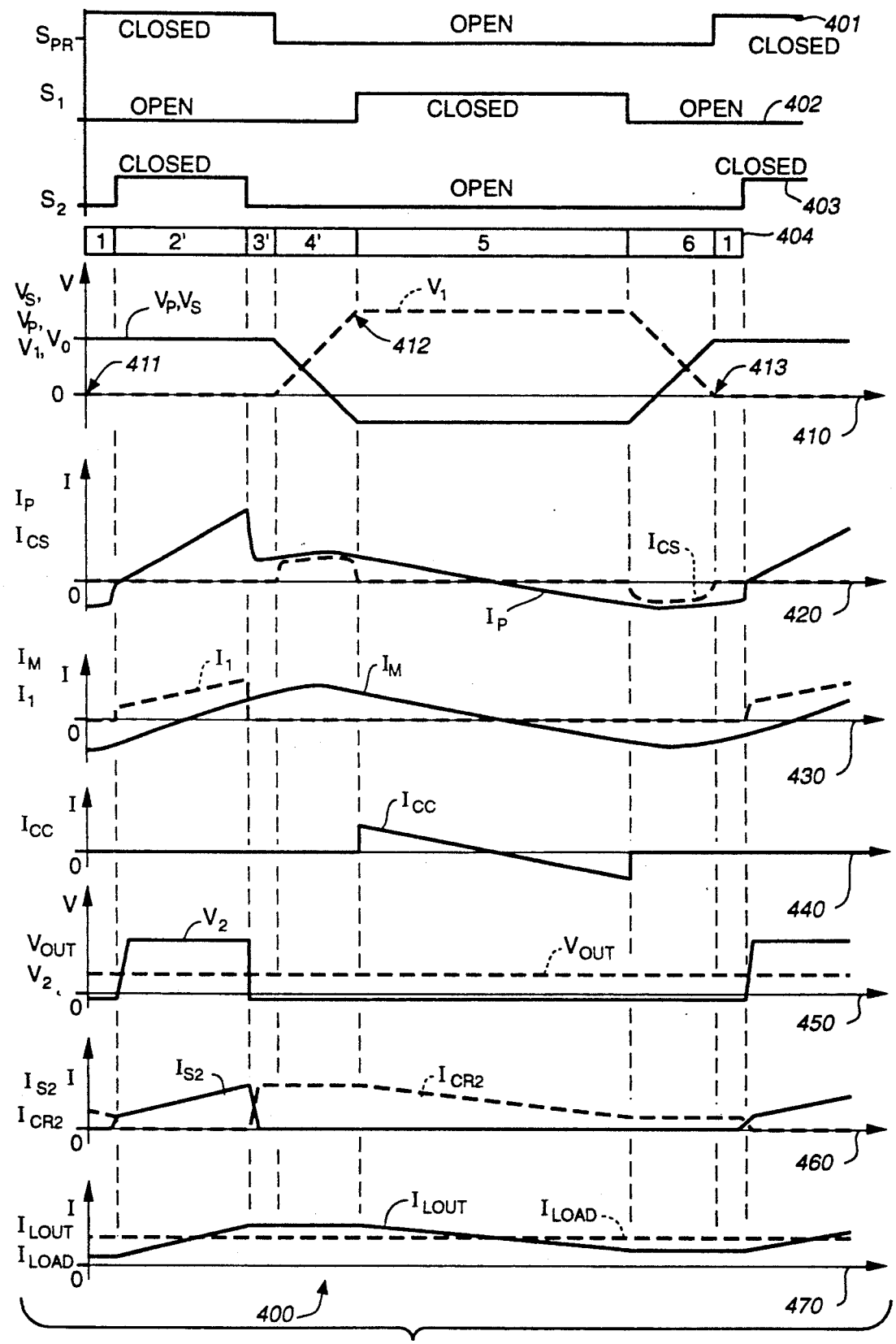
FIG._9

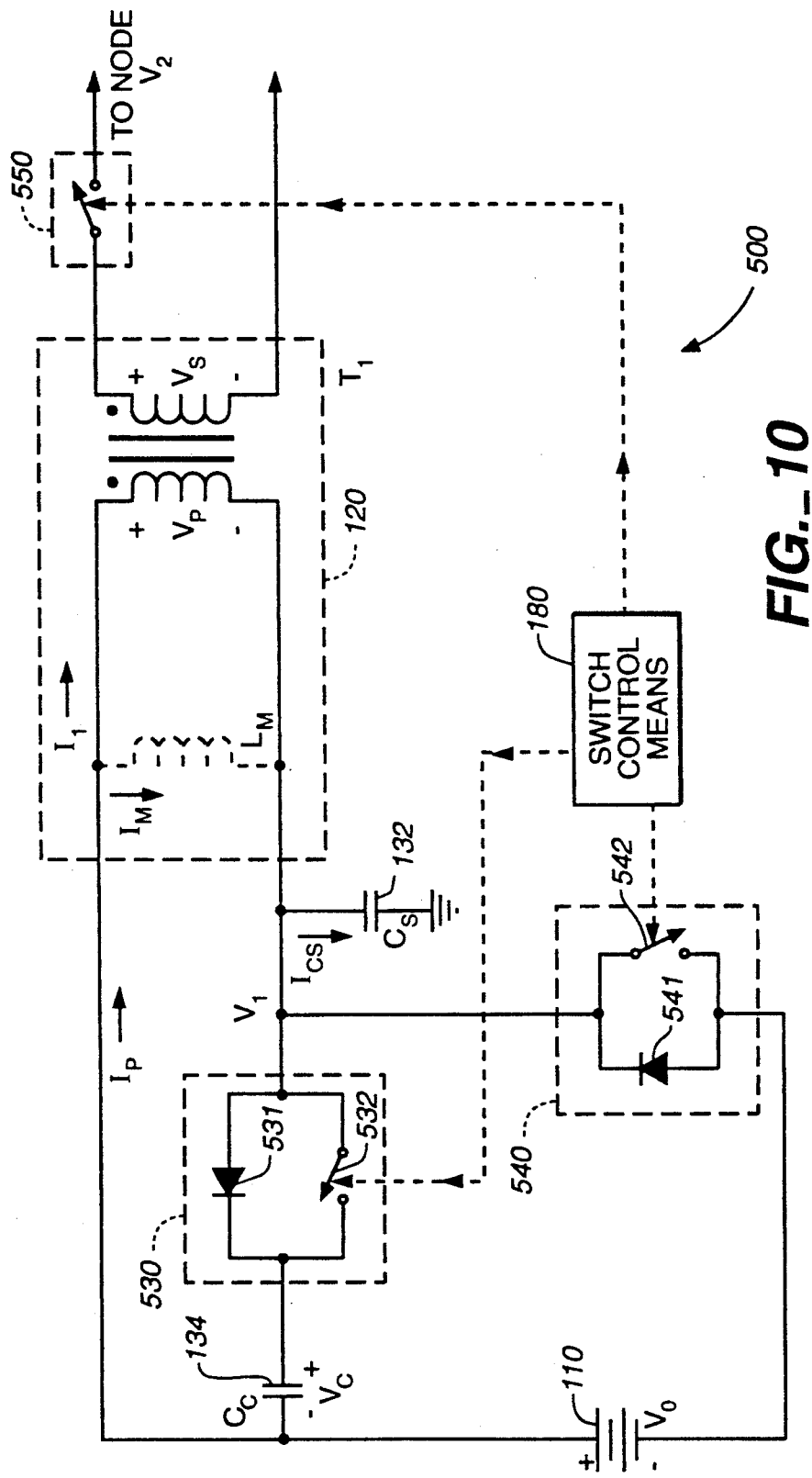
FIG._10

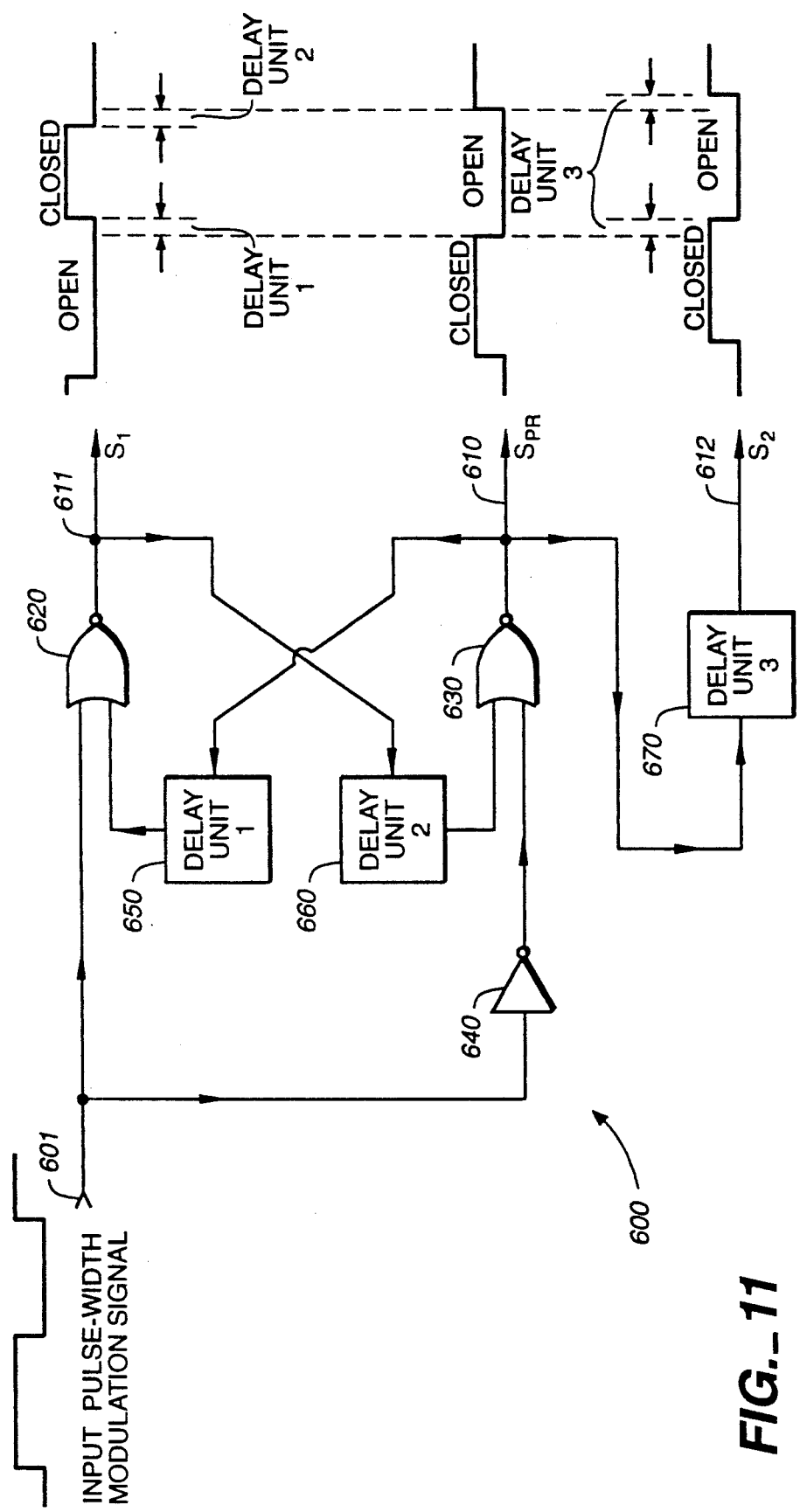
FIG._11

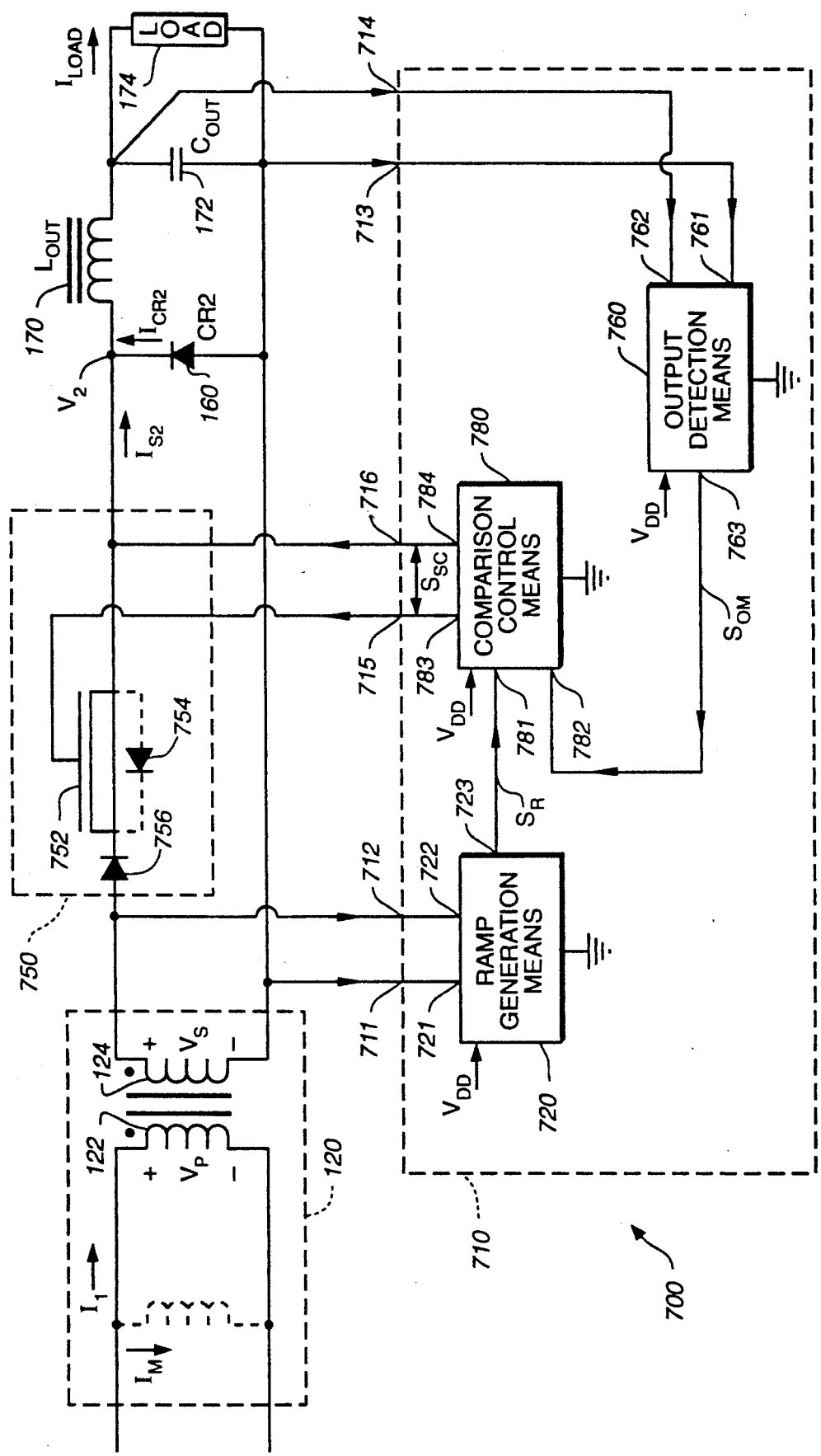
FIG._12

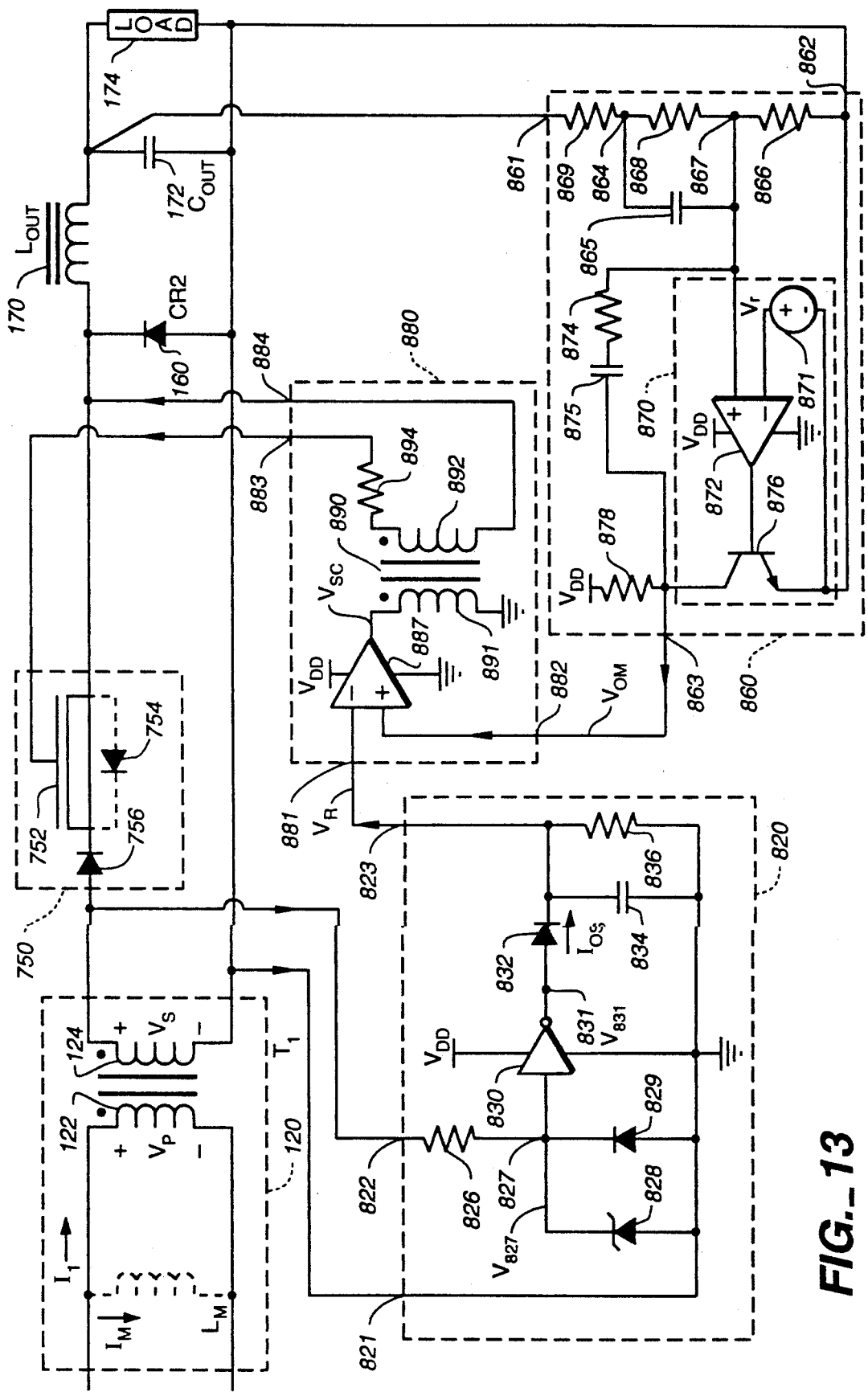
FIG._13

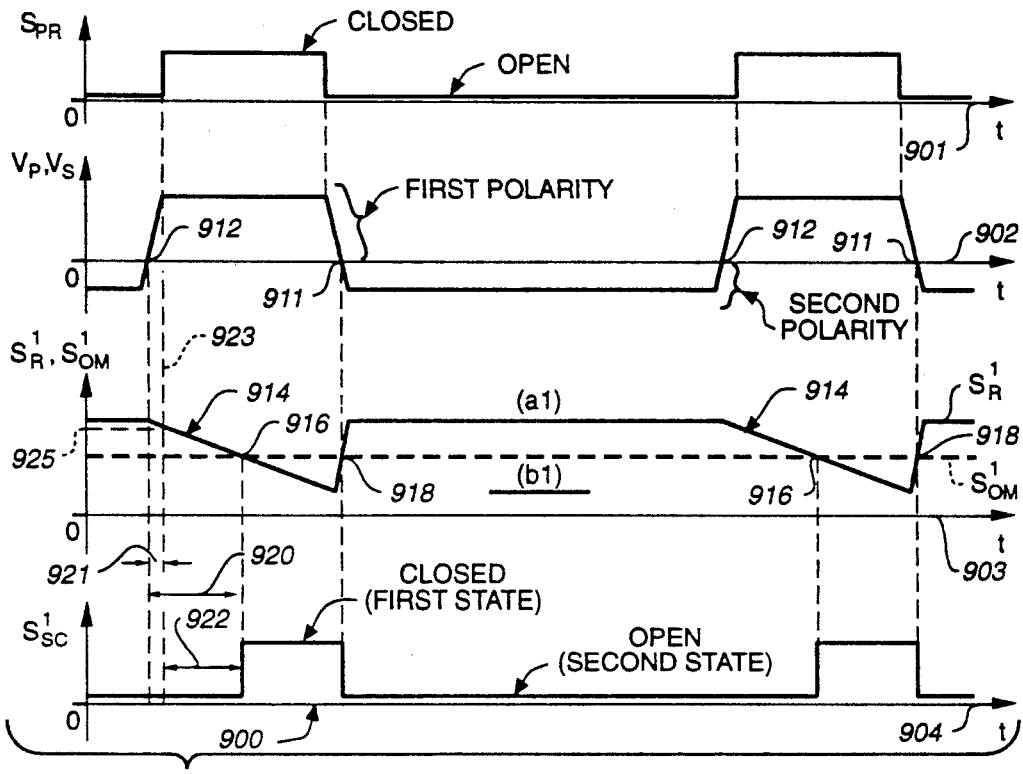
FIG._14A  FIG._14B
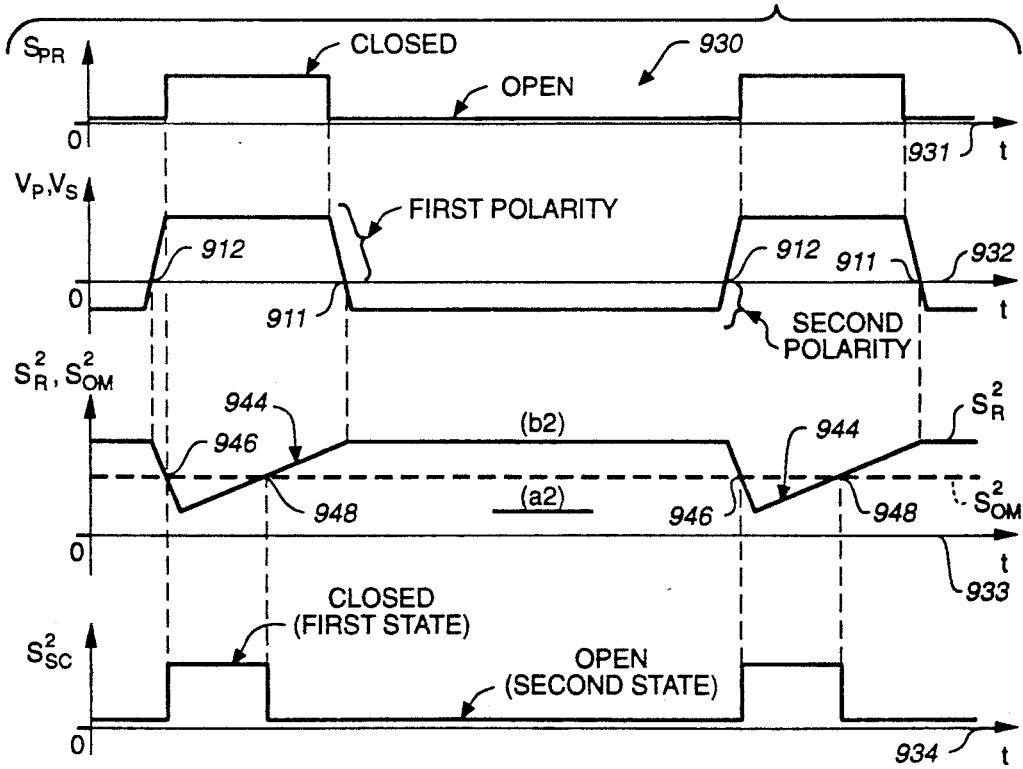

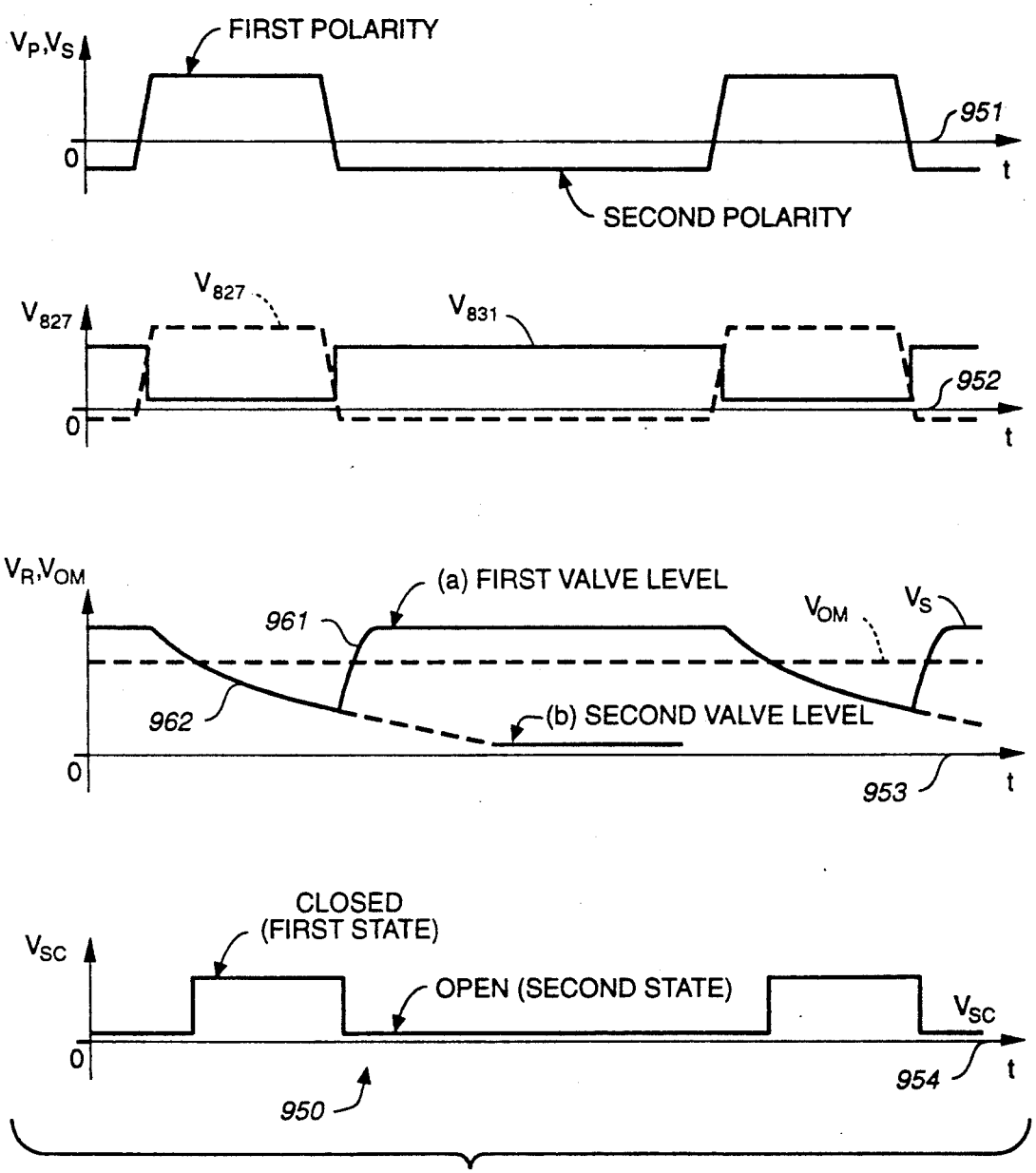
FIG._15

ZERO VOLTAGE SWITCHING POWER CONVERTER WITH SECONDARY SIDE REGULATION

This application is a continuation-in-part of U.S. patent application Ser. No. 07/668,587, filed Mar. 13, 1991 for Zero Voltage Switching Power Converter, now U.S. Pat. No. 5,173,846.

FIELD OF THE INVENTION

The present invention relates to DC-to-DC switching power converters which transfer power from a source supply at a given voltage potential to a destination load at a different voltage potential. In particular, the invention relates to the control of energy in transformers of DC-to-DC forward converters.

BACKGROUND OF THE INVENTION

The forward converter is a common circuit topology used to transform electric energy from a source at a given potential to a destination load at a different potential. Typically, the forward converter requires fewer components than other converter topologies and is smaller and lighter. The standard forward converter comprises a transformer having a primary winding, a secondary winding, and a third winding. The primary winding is coupled to a source of power, usually DC power, via a primary switch and the secondary winding is coupled to a load via two commutating diodes. The primary switch generally comprises a semiconductor switching device such as a field-effect transistor (FET) or a bipolar-junction transistor (BJT). When the primary winding is energized by the closing of the primary switch, energy is immediately transferred to the secondary winding, hence the name forward converter. The third winding is coupled to the power source via a rectifying diode and serves to reset the ferromagnetic core of the transformer when the primary switch is opened. The transformer's third winding provides a current path for discharging the transformer's magnetizing current, which is created when the primary winding is energized.

The standard forward converter is particularly well suited for low and medium power-conversion applications. However, it is not as efficient as other topologies in converting power, particularly in low power applications. The following factors contribute to the lower efficiency of the forward converter.

First, the core-reset operation in the forward converter using the third winding is not as efficient as other core-reset operations in other converter topologies. The rectifier in series with the third winding causes an amount of power dissipation and, more importantly, the addition of a third winding to the transformer increases the transformer's dimensions and thereby reduces the transformer efficiency by increasing the core losses, the resistance of each winding, and the self inductance of each winding.

Second, the forward converter only uses the first quadrant of the transformer's core B-H characteristic, leaving the third quadrant unused. As a result, the size of the transformer must be increased to enlarge the operating range of the first quadrant at the expense of higher core losses and higher winding resistances.

Third, the power dissipation in the primary switch when it is switched on (a turn-on event) is greater than the power dissipation in comparable switches in other topologies. The power dissipation in a switch during a switching event depends upon the product of the voltage across the switch and the current through the switch. In a forward converter, the voltage difference across the primary switch changes from a value equal to the input voltage of the power source to a value near zero when the switch is closed. Additionally, the primary current begins immediately since the forward converter provides current to the secondary winding immediately upon energizing the primary winding. The high input voltage and the instantaneous current flow in the primary switch leads to a high power dissipation loss in the primary switch. The power dissipation losses during switching events become more significant as the switching frequency of the forward converter is increased, as is done to improve the conversion efficiency of the converter's transformer. The direct power dissipation losses become more significant as the switching frequency increases because the duration of each switching event comprises a larger fraction of each switching cycle duration as the switching frequency increases.

The above first and second factors have been addressed in U.S. Pat. No. 4,441,146 issued to Vinciarelli. In U.S. Pat. No. 4,441,146, the third winding is eliminated and replaced by a series combination of a storage capacitor and an auxiliary switch coupled across either the primary or secondary winding. The auxiliary switch is operated counter to the primary switch, i.e., the auxiliary switch is open when the primary switch is closed and closed when the primary switch is open. When the primary switch is open, the storage capacitor and auxiliary switch operate to capture and store the transformer's magnetizing current, which was built up when the primary winding was energized, and then to return the magnetizing current to the transformer in a manner which resets the transformer's core. The elimination of the third winding addresses the first above efficiency factor. Additionally, the returning of the magnetizing current to the transformer creates a condition where the first and third quadrants of the transformer core's B-H characteristic are utilized, thereby addressing the second above efficiency factor.

The third efficiency factor, however, is not addressed by the prior art. In this respect, the present invention provides improvements to the basic forward-converter topology by reducing the power dissipation during switching events, thereby increasing the power-conversion efficiency of the basic forward-converter topology. Additionally, the present invention seeks to reduce this power dissipation while providing manufacturing modularity, simplicity, flexibility, and reliability.

SUMMARY OF THE INVENTION

The present invention recognizes that the magnetizing current in the forward converter's transformer is a source of energy that could be used to reduce the voltage across the converter's primary switch to a value near zero volts before the primary switch is closed to energize the primary winding. A reduction of voltage to near zero volts in magnitude (either positive or negative in value) just prior when the primary switch is closed greatly reduces the power dissipation in the primary switch means and is referred to as a zero-voltage-switching condition. The present invention further recognizes that the loading on the converter's secondary winding diverts some or all of the magnetizing current away from the primary winding into the secondary winding in the portion of the converter's switching cycle prior to the closing of the primary switch, thereby preventing such a zero-voltage-switching condition for the converter's primary switch under most operating conditions. The present invention also recognizes that a switch coupled in series with the secondary winding and operated in a specific manner may be used to block this loading by the secondary circuit. The present invention further recognizes that such a switch may also be operated to regulate the converter's output voltage, which provides a comparatively modular, simple, flexible, and reliable control means for operating the converter.

Broadly stated, the present invention encompasses means for isolating the loading effects of the secondary winding from the converter's transformer during the portion of the converter's switching cycle prior to the closing of the primary switch and means for reducing the voltage across the converter's primary switch to a value near zero before the primary switch is closed to energize the primary winding.

More specifically, the present invention applies to a power converter having a transformer, including a primary winding and a secondary winding, the secondary winding being coupled to an output load, and a primary switch means connected in series between the primary winding and a voltage source. The primary switch means causes energy to be stored in the transformer when the primary switch means is closed during an ON-period and causes the energy to be released from the transformer when the primary switch means is open during an OFF-period.

The present invention encompasses circuitry for isolating the loading effects of the secondary winding from the converter's transformer in a time interval preceding the closing of the primary switch means and for utilizing the magnetizing energy stored in the transformer to reduce the voltage across the primary switch to a value near zero before the primary switch means is closed. The present invention further encompasses circuitry for regulating the converter's output voltage while isolating the loading effect of the secondary winding. The isolation and utilization circuitry comprises a storage capacitor and a first switch means coupled in series with the storage capacitor. The series combination of the storage capacitor and the first switch means is coupled in parallel with a selected one of the transformer windings.

The isolation and utilization circuitry further comprises a second switch means connected in series with the secondary winding of the transformer and a switch control means for operating the first and second switch means in relation to the ON-periods and OFF-periods of the primary switch means. The switch control means closes the first switch substantially when the primary switch means opens and opens the first switch means prior to when the primary switch means closes to create a zero-voltage switching condition across the primary switch means when the primary switch means is next closed.

The switch control means includes a secondary-side control means for controlling the second switch means and for regulating the output voltage of the converter. The secondary-side control means closes the second switch means after the primary switch means closes and opens the second switch means before the first switch means closes. Additionally, the secondary-side control means controls the duration that the second switch means is closed such that the value of the converter's output voltage is regulated within a predetermined voltage range.

As such, the second switch means remains open in the portion of the converter's switching cycle prior to the closing of the primary switch means. This isolates the loading effects of the secondary winding from the converter's transformer and creates a zero-voltage-switching across the primary switch means when the primary switch means is next closed.

In a further embodiment of the present invention, the secondary-side control means comprises means for operating the second switch means in response to the voltage detected across the secondary winding, thus making the switch control circuitry for the second switch means autonomous from the means for controlling the primary switch means and the first switch means, called the primary-side control means. The secondary circuit is autonomous in that it does not require that any of its input signals be directly generated by the primary-side control means. Thus, the control circuitry may be modularized into a primary-side control means and a secondary-side control means, which enable greater manufacturing simplicity, flexibility and reliability.

Accordingly, it is an object of the present invention to provide greater power conversion efficiencies for the plurality of forward-converter circuit topologies over a greater dynamic range of load current levels.

It is another object of the present invention to provide zero-voltage-switching conditions for the primary switch means and to provide these conditions over a large dynamic range of load current levels.

It is still a further object of the present invention to provide a switch control means for controlling the second switch means which operates in an autonomous manner with respect to the means for controlling the primary switch means to provide zero-voltage-switching conditions for the primary switch means and to regulate the output voltage of the converter.

It is yet a further object of the present invention to modularized the converter's control means into a primary-side control means and a secondary-side control means to provide greater manufacturing simplicity, flexibility and reliability.

These and other objects of the present invention will become apparent to those skilled in the art from the following detailed description of the invention and from the accompanying drawings.

BRIEF DESCRIPTION OF THE DRAWINGS

FIG. 1 is a circuit diagram of the standard forward converter according to the prior art.

FIG. 2 is a timing diagram of key voltages and currents of the standard forward converter shown in FIG. 1.

FIG. 3 is a circuit diagram of a modified forward converter having a series combination of a storage capacitor and auxiliary switch coupled in parallel with the primary transformer winding according to the prior art.

FIG. 4 is a first timing diagram of key voltages and current of the modified forward converter shown in FIG. 3 under light loading conditions.

FIG. 5 is a second timing diagram of key voltages and currents of the modified forward converter shown in FIG. 3 under heavy loading conditions.

FIG. 6 is a circuit diagram of an exemplary embodiment of the forward converter according to the present invention.

FIG. 7 is a timing-requirement diagram showing the operation of the first and second switch means of the exemplary embodiment of the forward converter shown in FIG. 6.

FIG. 8 is a first timing diagram of key voltages and current of the exemplary embodiment of the forward converter shown in FIG. 6 under a first switching-event sequence.

FIG. 9 is a second timing diagram of key voltages and current of the exemplary embodiment of the forward converter shown in FIG. 6 under a second switching-event sequence.

FIG. 10 is a partial block diagram of the forward converter shown in FIG. 6 showing exemplary embodiments of the primary switch means and the first switch means according to the present invention.

FIG. 11 is a circuit diagram of an exemplary embodiment of the switch control means according to the present invention.

FIG. 12 is a partial block diagram of the forward converter shown in FIG. 6 showing an exemplary embodiment of the second switch means according to the present invention and an exemplary embodiment of an autonomous switch control means according to the present invention for said second switch means such that the output voltage is regulated thereby.

FIG. 13 is a partial block diagram of the forward converter shown in FIG. 6 showing exemplary embodiments of the ramp generation means, output detection means, and comparison control means of the autonomous control means according to the present invention.

FIG. 14A is a first timing diagram of key signals of a first embodiment of the autonomous switch control means according to the present invention shown in FIG. 12.

FIG. 14B is a second timing diagram of key signals of a second embodiment of the autonomous switch control means according to the present invention shown in FIG. 12.

FIG. 15 is a timing diagram of key voltages of the forward converter and autonomous control means according to the present invention shown in FIG. 13.

DETAILED DESCRIPTION OF THE PRESENT INVENTION

The features of the present invention may be better appreciated and comprehended with a more detailed description of the prior art development of the forward converter. The basic topology of the forward converter is shown at 1000 in FIG. 1 and comprises a transformer 1020 having a primary winding 1022 and secondary winding 1024, a primary switch means 1040 ($S_{PR}$) connected in series with primary winding 1022, and rectifiers 1050 (CR1) and 1060 (CR2) which direct power from secondary winding 1024 to a load 1074. Transformer 1020 further comprises a third winding 1026, which provides a means for resetting the core of transformer 1020, as discussed below in greater detail. A voltage source 1010 having a value $V_0$ supplies forward converter 1000 with power and a choke inductor 1070 ($L_{OUT}$) and a load capacitor 1072 ($C_{OUT}$) are used to filter the power delivered to load 1074. Additionally, converter 1000 comprises a capacitor 1032 ($C_S$) for representing the stray (parasitic) capacitance associated with primary winding 1022 and switch means 1040. As discussed below, an imaginary inductor is used to model the effects of the magnetizing energy of transformer 1020. The modeling inductor is indicated in phantom as inductor 1023 in FIG. 1 and is coupled in parallel with primary winding 1022. As such, the magnetizing effects of transformer 1020 can be readily analyzed in the form of a magnetizing current. The use of modeling inductor 1023 in this manner is well known to the transformer art and is discussed in greater detail below. Nonetheless, it is important to recognize that inductor 1023 is not a real component of converter 1000 but rather an imaginary modeling component which aids in explaining the characteristic behavior of the magnetizing energy in real transformer 1020.

Certain voltages and currents in converter 1000 are significant and their symbolic notations are detailed below with reference to FIG. 1. The voltage across primary winding 1022 is designated as $V_P$, the voltage across secondary winding 1024 is designated as $V_S$, and the voltage across the third winding 1026 is designated as $V_T$. Each of these winding voltages is referenced such that the positive terminal coincides with the magnetic reference dot shown in FIG. 1. There are two node voltages of significance. At the node coupling the negative terminal of primary winding 1022 to primary switch means 1040, the voltage at this node with respect to ground is designated as $V_1$ and the node itself is referred to as node $V_1$. At the node coupling rectifiers 1050 and 1060 to choke inductor 1070, the voltage at this node with respect to ground is designated as $V_2$ and the node itself is referred to as node $V_2$.

The following currents are significant. The current flowing into third winding 1026 at the positive terminal is designated as $I_T$, the current flowing into primary winding 1022 at the positive terminal is designated as $I_1$, the current flowing into inductor 1023 from voltage source 1010 is designated as $I_M$, and the total primary current flowing into both inductor 1023 and winding 1022 from voltage source 1010 is designated as $I_P$. The current flowing into Capacitor 1032 ($C_S$) from node $V_1$ is designated as $I_{CS}$. Rectifiers 1050 (CR1) and 1060 (CR2) have the current reference designations $I_{CR1}$ and $I_{CR2}$, respectively, where the current references flow into the anode terminals of each rectifier. The current flowing through choke inductor 1070 ($L_{out}$) is designated by the current reference designation $I_{LOUT}$, where the current reference flows toward load 1074. The current flowing through load 1074 is designated by the current reference designation $I_{LOAD}$, where the current reference flows from choke inductor 1070 to ground.

For the purposes of discussion, primary winding 1022 and secondary winding 1024 are taken to have the same number of turns. The dot notations for windings 1022 and 1024 indicate their polarities. As mentioned above, an imaginary inductor 1023 ($L_M$) is indicated, in phantom, in the circuit diagram for transformer 1020 to model the effects of the magnetizing flux and magnetizing current of transformer 1020. As well known in the transformer art, a current must be provided to one of windings of a real transformer to provide the magnetomotive force required to overcome the magnetic reluctance of the transformer's core. This current is known as the magnetizing current and is generally provided to the primary winding of the transformer. Since an ideal transformer does not have any magnetic reluctance, magnetizing currents are not present in an ideal transformer. In a real transformer, the magnetizing current can be electrically modeled by a phantom inductor coupled in parallel with the primary winding of an ideal transformer, as shown by inductor 1023. This is because the magnetizing current is proportional to the time integral of the voltage appearing across the primary winding of the transformer. The inductance value $L_M$ of the phantom modeling inductor 1023 is set to a value representative of the core reluctance of transformer 1020, as well known in the transformer art.

The magnetizing current is a parasitic effect and does not exist in an ideal transformer. As such, the magnetizing current component in the primary winding circuit is not transformed into current in the secondary winding. The current flowing in secondary winding 1024 is related to the current flowing into primary winding 1022 and is not related to the current flowing in inductor 1023. For the purposes of understanding the operation of transformer 1020, primary winding 1022, secondary winding 1024, and third winding 1026 function as an ideal transformer while inductor 1023 functions to account for the magnetizing current in transformer 1020. As such, the above mentioned current $I_P$ represents the current flowing into the primary winding of a real transformer, the above mentioned current $I_M$ represents the component of primary current $I_P$ needed to overcome the reluctance of the real transformer, and the above mentioned current $I_1$ represents the component of primary current $I_P$ which is actually transformed over to the secondary winding of the real transformer. As a point of generality, inductor 1023 can be coupled in parallel with secondary winding 1024 rather than with primary winding 1022 to represent the magnetizing current.

The magnetizing current causes energy to be stored in the transformer's core when the transformer's primary winding is energized by the closing of primary switch means 1040. This energy is stored in the form of magnetic flux in the core and is referred to as the magnetizing flux. The magnetizing flux must be periodically discharged to prevent the flux in the core from reaching a saturation point, at which time the transformer ceases to provide transformer action. As discussed below, the material properties of the core limit the total amount of flux the core can store. The flux energy is discharged by discharging the magnetizing current through one of the transformer's windings. The discharging process is formally known as resetting the core.

To provide for the discharging of the magnetizing energy in forward converter 1000, third winding 1026 of transformer 1020 is coupled in series with a rectifier 1030 and the series combination is coupled across voltage source 1010. Rectifier 1030 is oriented to direct the flow of current into the positive terminal of voltage source 1010 and the reference dot of third winding 1026 is opposite to that of primary winding 1022. As such, current is conducted in third winding 1026 towards voltage source 1010 when the voltage $V_T$ across third winding 1026 is less than or equal to $-V_0$. For the purposes of discussion, third winding 1026 is taken to have the same number of turns as primary winding 1022. The discharging of the magnetizing current through third winding 1023 is detailed below in the discussion of the operation of forward converter 1000.

The operation of the forward converter 1000 is governed by primary switch means 1040 which causes converter 1000 to enter an ON-period when it is closed and to enter an OFF-period when it is open. When primary switch means 1040 is closed, magnetizing current and magnetic energy build up in inductor 1023 of transformer 1020 due to the voltage applied across inductor 1023 by voltage source 1010. The magnetizing current in magnetizing inductor 1023 increases at a constant rate with respect to time (i.e., the waveform of the magnetizing current has a positive linear slope). At the same time, the voltage across primary winding 1022 is also applied to secondary winding 1024 by transformer action and a current in secondary winding 1024 is induced to flow through rectifier 1050 towards load 1074. A current equal in magnitude to the current in secondary winding 1024 is generated in primary winding 1022 by transformer action. Current flow through third winding 1026 is blocked by rectifier 1030 due to the orientation of rectifier 1030 and the polarity of third winding 1026.

When primary switch means 1040 is opened to start the OFF-period, the magnetizing current built up in inductor 1023 flows into capacitor $C_S$, consequently increasing the voltage $V_1$. The current in primary winding 1022 and secondary winding 1024 continue to flow until the voltage $V_1$ reaches a value equal to $V_0$. During this time, the current in primary winding 1022 also flows into capacitor $C_S$ to raise the voltage $V_1$. At the point when the voltage $V_1$ equals $V_0$, the voltage across rectifier 1050 (CR1) becomes negative, thereby stopping the current flow in secondary winding 1024 and primary winding 1022.

The magnetizing current in inductor 1023 continues to flow into capacitor $C_S$ until the voltage $V_1$ equals $2V_0$, at which point the voltage across third winding 1026 is equal to $-V_0$ and a current begins to flow in third winding 1026 via rectifier 1030. The winding voltages $V_P$, $V_S$ and $V_T$ of transformer 1020 are clamped to a value of $V_0$, thus preventing any further charging of capacitor $C_S$. The magnetizing current is then diverted away from capacitor $C_S$ and into primary winding 1022, where it is transformed over to third winding 1026 and discharged at a constant rate into voltage source 1010 ($L_M dI_M/dt = -V_0$). During this time, the waveform of the magnetizing current has a negative, linear slope and the waveform of the current in secondary winding 1024 is constant at zero amperes. The magnetizing current decreases until the magnetic energy built up in transformer 1020 during the ON-period is completely transferred to voltage source 1010 or until primary switch means 1040 is closed again.

The ratio of the duration of the ON-period to the time interval between each successive ON-period is known as the duty-cycle of the converter (e.g., duty-cycle=- $T_{ON}/(T_{ON}+T_{OFF})*100\%$). The duty-cycle is adjusted to meet the power requirements of the load, with a higher duty-cycle providing more power to the load. The duration of one ON-period and the subsequent OFF-period is often referred to as the switching cycle. The OFF-period is often referred to as the "fly-back" phase due to the abrupt reversals in the voltages and changes of the currents of the transformer windings. It is also referred to as the "reset" phase since the magnetic energy and flux in the transformer core decreases to zero during this time. The voltage that develops across primary switch means 1040 during the OFF-period is greater than the value provided by voltage source 1010 and is referred to as the "reset" voltage.

Under steady-state conditions, the output voltage $V_{OUT}$ and the duty-cycle of the forward converter are generally related as follows. When choke inductor 1070 continuously provides current to load 1074 throughout the switching cycle, the output voltage $V_{OUT}$ is equal to the input voltage $V_0$ times the duty cycle, as expressed in the form of a fraction (i.e., divided by 100%). This is because the output voltage $V_{OUT}$ adjusts to a voltage level such that the time-integrated voltage applied across choke inductor 1070 during each switching cycle is equal to zero, under steady state conditions. During the ON-period duration, $T_{ON}$, the voltage applied to choke inductor 1070 is $(V_0-V_{OUT})$ volts. During the OFF-period duration, $T_{OFF}$, the voltage applied to choke inductor 1070 is $(-V_{OUT})$ volts. Setting the time-integrated voltage to zero (i.e., $T_{ON}(V_0-V_{OUT})-T_{OFF}V_{OUT}=0$) and solving for $V_{OUT}$ results in $V_{OUT}=V_0T_{ON}/(T_{ON}+T_{OFF})=V_0*$(duty-cycle/100%). In the case where choke inductor 1070 does not continuously provide current to load 1074, due to low load-current demand, the relationship between the duty-cycle and the output voltage is considerably more complex and depends upon the output current level required by load 1074. The derivation and presentation of this more complex relationship are not necessary in order to understand the present invention and enable one of ordinary skill in the art to make and use the present invention. (The derivation and presentation of the more complex relationship may be found in the forward converter switching art.) For the purposes of presenting the present invention and without loss of generality, the exemplary operating conditions presented hereinbelow assume that choke 1070 continuously provides current to load 1074 and makes use of the relationship $V_{OUT}=$(duty-cycle/100%)$*V_0$.

The steady-state waveform for the key voltages and currents of forward converter 1000 are shown in timing diagram 2000 in FIG. 2. For the purposes of this discussion, each winding of transformer 1020 has the same number of turns and has no parasitic resistance and transformer 1020 is operated in the linear regime of its B-H characteristic. Additionally, each rectifier has a nominal voltage drop for forward conducting current, near zero current conduction for reverse applied voltage and has a nominal amount of reverse-recovery current. To simplify the discussion of forward converter 1000, the output voltage across load 1074 is taken to be constant at a value of one third the input voltage ($V_0/3$). Furthermore, load 1074 is taken to be resistive in nature without loss of generality.

The operation of primary switch means 1040 is shown in graph 2001 in FIG. 2. Graph 2001 is in a form of a time line which indicates the ON-periods where primary switch means 1040 ($S_{PR}$) is closed and the OFF-periods where primary switch means 1040 is open. An exemplary duty-cycle of 33.3%, which is consistent with an output voltage $V_{OUT}$ of $V_0/3$, is shown for primary switch means 1040 in graph 2001. The winding voltages $V_P$, $V_S$ and $V_T$ and the voltage $V_1$ are shown in graph 2002 in FIG. 2. For the primary circuit, the total primary current $I_P$ and the current $I_{CS}$ into capacitor $C_S$ are shown in graph 2003, the magnetizing current $I_M$ in inductor 1023 and the current $I_1$ in primary winding 1022 are shown in graph 2004, and the current $I_T$ in third winding 1026 is shown in graph 2005 in FIG. 2. For the secondary circuit, the output voltage $V_{OUT}$ at load 1074 and the voltage $V_2$ are shown in graph 2006, the currents $I_{CR1}$ and $I_{CR2}$ in rectifiers 1050 (CR1) and 1060 (CR2) are shown in graph 2007, and the current $I_{LOUT}$ in choke inductor 1070 and the current $I_{LOAD}$ in load 1074 are shown in graph 2008 in FIG. 2. In comparing the rectifier currents in graph 2007 against the inductor current $I_{LOUT}$ in graph 2008, it may be seen that the rectifier current $I_{CR1}$ supports the inductor current $I_{LOUT}$ during the ON-periods and that the rectifier current $I_{CR2}$ supports the inductor current $I_{LOUT}$ during the OFF-periods.

During the ON-period, the voltage across all three windings is set by voltage source 1010 at a value of $V_0$, with the voltage $V_1$ across primary switch means 1040 at near zero volts, as shown in graph 2002. The application of $V_0$ across the secondary winding causes rectifier 1050 (CR1) to fully support the current in choke inductor 1070. Via the transformer action of transformer 1020, the rectifier current $I_{CR1}$ is replicated in the current $I_1$ of primary winding 1022, as shown in graph 2004. Also during the ON-period, the magnetizing current $I_M$ increases at a constant rate determined by the voltage applied across inductor 1023 and the magnetizing inductance of inductor 1023, as also shown in graph 2004. The total primary current $I_P$ is equal to the sum of $I_1$ and $I_M$ and is shown in graph 2003.

As switch means 1040 opens to begin the OFF-period, the magnetizing current in inductor 1023 initially flows into capacitor 1032 ($C_S$) and raises the voltage $V_1$ towards twice the input voltage $V_0$. The charging current into capacitor $C_S$ is shown as $I_{CS}$ in graph 2003. Once voltage $V_1$ reaches a value of $V_0$, the current in the primary and secondary windings ceases, as described above, and rectifier 1060 (CR2) supports the current $I_{LOUT}$ of choke inductor 1070. Once voltage $V_1$ reaches $2V_0$ and the transformer winding voltages $V_P$, $V_S$, and $V_T$ reach $-V_0$, the magnetizing current $I_M$ reverses polarity and flows into primary winding 1022 ($I_1$), where it is transformed over to third winding 1026 ($I_T$) and discharged back into voltage source 1010. This process is shown in graphs 2004 and 2005 and occurs during the first part of the OFF-period. The time required to discharge the magnetizing current is roughly equal to the duration of the ON-period because the voltage applied to inductor 1023 during the first part of the OFF-period is equal in magnitude, but opposite in sign, to the voltage applied to inductor 1023 during the ON-period.

During the second part of the OFF-period, the winding voltages $V_P$, $V_S$, and $V_T$ return to zero volts and the voltage $V_1$ return to a value of $V_0$. The currents in the primary circuit and secondary winding 1024 cease while the current in rectifier 1060 continues to support the current $I_{LOUT}$. The second part of the OFF-period may be characterized as dead-time since transformer 1020 is neither providing power to the secondary circuit nor having its core reset. The dead time allows converter 1000 to increase the duty cycle, i.e., increase the duration of the ON-period while decreasing the OFF-period, toward 50% in order to provide more power to load 1074, if needed.

There are several critical operational aspects which affect the reliability and power-conversion efficiency of forward converter 1000. One aspect relates to the magnetic operation of transformer 1020, which is usually constructed with a core of soft ferromagnetic material of negligible hysteresis. Due to physical properties of the ferromagnetic material, the core can only support a maximum amount of magnetic flux density, B. Since the magnetic flux $\Phi$ is proportional to the magnetic flux density B by the number of turns and the cross-sectional area of the winding, the core can only support a maximum amount of magnetic flux and, hence, magnetizing current. This amount is referred to as the saturation flux value. Beyond the saturation flux value, the transformer ceases to operate.

The saturation of magnetic flux limits the amount of power that converter 1000 may provide to load 1074 during each ON-period. To increase the saturation flux value, the number of turns in each winding can be increased or the cross-sectional area can be increased. Either of these increases, however, increases the parasitic resistances of the windings and thereby decreases the efficiency of converter 1000. As noted in U.S. Pat. No. 4,441,146 issued to Vinciarelli, converter 1000 only uses the first quadrant of the transformer's B-H curve and, hence, only uses one half of the transformer's flux range. If both the first and third quadrant of the transformer's B-H curve are used instead of only the first quadrant, the transformer of a forward converter can be re-designed to reduce the winding resistances and thereby increasing the converter's efficiency. Such an approach is taken in the above cited U.S. Pat. No. 4,441,146.

Another operational aspect of forward converter 1000 relates to the voltages and currents of primary switch means 1040 during switching events. Primary switch means 1040 generally comprises a semiconductor device such as a field-effect transistor (FET) or a bipolar-junction transistor (BJT). When switching from the OFF-period to the ON-period, it takes a finite amount of time for the voltage across primary switch means 1040 to decrease to zero as the current through primary switch means 1040 increases, resulting in a large power dissipation in primary switch means 1040. The dissipated power is equal to the product of both the current and voltage and is zero if either quantity is zero. The power dissipated during the switching transitions directly reduces the conversion efficiency by converting electrical energy into heat. In turn, the reliability and lifetime of primary switch means 1040 is reduced by the heating. The present invention addresses this power conversion loss by providing means for driving the voltage across the primary switch means to near zero volts before the primary switch means is closed. The condition whereby the voltage across the primary switch means is driven to zero volts before the primary switch is closed is herein referred to as a zero-voltage-switching condition.

While switching from the ON-period to the OFF-period, it takes a finite amount of time for the current in primary switch means 1040 to decrease to zero as the voltage across the switch means 1040 increases, resulting in a power dissipation in switch means 1040. The power dissipation during this transition is much less than the dissipation in the transition from the OFF-period to the ON-period, typically between one and two orders of magnitude less. The difference is dissipation is related to the properties of the transistor device, either FET or BJT, and an explanation of the difference is not necessary in order to understand the present invention and enable one of ordinary skill in the art to make and use the same.

Another operational aspect of forward converter 1000 relates to the voltage stress on primary switch means 1040 during the OFF-period. During the OFF-period, the voltage across primary winding 1022 reverses and adds with voltage source 1010 to produce a voltage stress on primary switch means 1040 approximately equal twice the input voltage $V_0$. This voltage stress affects the reliability of forward converter 1000 directly and the conversion efficiency indirectly. The indirect effect on efficiency is explained below as follows. Due to the material properties of semiconductor devices, FET and BJT devices can only withstand a predetermined maximum voltage, known as a breakdown voltage, across their conduction terminals before the devices are destroyed. It is well known within the semiconductor device fabrication art that increasing the breakdown voltage of a BJT or FET device requires increasing the "on"-resistance between the conduction terminals of the semiconductor device. The increased "on"-resistance lowers the conversion efficiency by increasing the power dissipation in primary switch means 1040 during the ON-period.

To address the indirect power dissipation losses due to the under-utilization of the core and due to voltage stresses on the primary switch means, a modification to the standard forward converter has been proposed in U.S. Pat. No. 4,441,146 issued to Vinciarelli. This modification does not, however, address the direct power dissipation losses in the primary switch means during transitions between the ON and OFF-periods. Such direct power dissipation losses become more significant as the switching frequency increases since the duration of each switching event comprises a larger fraction of each switching cycle duration as the switching frequency increases. As the present invention builds on the teachings of prior art active clamp circuits, an exemplary such circuit is discussed in greater detail below with reference to FIGS. 3 through 5.

Such a modified forward converter is shown at 3000 in FIG. 3 and is disclosed in an article by B. Carsten, entitled "High Power SMPS Require Intrinsic Reliability," PCI Proceedings, March 1982, pp. 456–471 as well as in U.S. Pat. No. 4,441,146 issued to Vinciarelli. The topology of forward converter 3000 is similar to the topology of forward converter 1000 with the exception that third winding 1026 and rectifier 1030 of converter 1000 are replaced by a series combination of a storage capacitor 3034 and an auxiliary switch means 3030. The latter two components are used to control the reset of the transformer core during the OFF-period, as explained below. With the exception of storage capacitor 3034 and auxiliary switch means 3030, each element of converter 3000 is the same as a corresponding element of converter 1000. Consequently, the number designation for each element of converter 3000 is set to be equal to the number designation of the corresponding element in converter 1000 plus a value of two-thousand.

As discussed above with reference to converter 1000, an imaginary inductor is used to model the effects of the magnetizing energy of transformer 3020. The modeling inductor is indicated in phantom as inductor 3023 in FIG. 3 and is coupled in parallel with primary winding 3022. As such, the magnetizing effects of transformer 3020 can be readily analyzed in the form of a magnetizing current. The use of modeling inductor 3023 in this manner is well known to the transformer art and not a real component of converter 3000, but rather an imaginary modeling component which aids in explaining the characteristic behavior of the magnetizing energy in real transformer 3020.

Storage capacitor 3034 and auxiliary switch means 3030 are coupled in series to one another. One terminal of the series combination is coupled to the switched terminal of primary winding 3022 (at node $V_1$) and the other end is coupled to a constant voltage reference, which is the positive terminal of voltage source 3010 in this case. Storage capacitor 3034 and auxiliary switch means 3030 comprise means for discharging the magnetizing current in inductor 3023 during OFF-periods when primary switch means 3040 is open. Additionally, storage capacitor 3034 and auxiliary switch means 3030 comprise means for causing converter 3000 to use the third quadrant of transformer 3020's B-H characteristic. These means are explained below in greater detail.

As in converter 1000, certain voltages and currents in converter 3000 are significant and their symbolic notations are detailed below with reference to FIG. 3. The symbolic notations $V_P$, $V_S$, $V_1$, $V_2$ $I_1$, $I_M$, $I_P$, $I_{CS}$, $I_{CR1}$, $I_{CR2}$, $I_{LOUT}$, and $I_{LOAD}$ shown in FIG. 3 have the same designations and references as the corresponding notations in FIG. 1. Additionally, the current flowing in capacitor 3034 ($C_C$) from switch means 3030 is designated by the current reference designation $I_{CC}$.

As with forward converter 1000, the operation of forward converter 3000 is governed by primary switch means 3040, which causes converter 3000 to enter an ON-period when switch means 3040 is closed and to enter an OFF-period when switch means 3040 is open. Auxiliary switch means 3030 operates counter to primary switch means 3040 by opening when primary switch means 3040 closes and by closing when primary switch means 3040 opens. The operation of converter 3000 is explained in greater detail below with the assumption that the voltage at the positive terminal of capacitor 3034 with respect to ground is greater than $V_0$, which is the voltage value of voltage source 3010.

During the ON-period, when primary switch means 3040 is closed and auxiliary switch means 3030 is open, a voltage of $V_0$ appears across secondary winding 3024 causing a secondary current to flow through rectifier 3050 and a corresponding current to flow in primary winding 3022 due to transformer action. At the same time, a magnetizing current builds up in inductor 3023 at a constant rate due to the application of a constant voltage of $V_0$ across inductor 3023 by voltage source 3010.

When primary switch means 3040 is opened and auxiliary switch means 3030 is closed to start the OFF-period, the voltage across primary winding 3022 and secondary winding 3024 abruptly reverses to a negative value since the voltage at the positive terminal of capacitor 3034 is greater than $V_0$. As a result, the current flow through secondary winding 3024 abruptly stops due to the reversal in the voltage across the secondary winding and the blocking action of rectifier 3050. In response to secondary winding 3024, the current flow through primary winding 3022 also abruptly stops. The magnetizing current, however, continues to flow and is diverted from primary switch means 3040 into storage capacitor 3034 via auxiliary switch means 3030. For the purposes of discussion and without loss of generality, the capacitance of storage capacitor 3034 is taken to be large enough so that the voltage across storage capacitor 3034 does not substantially change during the OFF-period. Since a constant negative voltage is being applied to inductor 3023 during the OFF-period, the magnetizing current $I_M$ decreases at a constant rate, thereby acting to reset the transformer core. If the OFF-period is sufficiently long, the decrease in $I_M$ continues to the point where current $I_M$ reverses direction and flows out of storage capacitor 3034 and into voltage source 3010.

To prevent the core from saturating during steady-state operations, the time-integrated voltage across inductor 3023, and hence across each winding of transformer 3020, should be zero for each switching cycle, otherwise the magnetic flux in the core of transformer 3020 will saturate within a finite number of switching cycles. In the steady-state operation of converter 3000, the voltage $V_C$ across capacitor 3034 is at a value which sets the time-integrated voltage across inductor 3023 to zero during each switching cycle. This value is referred to as the required value for $V_C$ which prevents core saturation and may be determined as follows. During the ON-period duration $T_{ON}$, a voltage of $+V_0$ is applied to inductor 3023 by voltage source 3010. During the OFF-period duration $T_{OFF}$, the voltage applied to inductor 3023 is the negative of the voltage across storage capacitor 3034; $-V_C$. In this case, the time-integrated voltage during each switching cycle is determined as:

$$\text{Time Integrated Voltage} = T_{ON} \cdot V_0 - T_{OFF} \cdot V_C \qquad (1)$$

Setting the time integrated voltage to zero and solving for the required value of $V_C$, which sets the time-integrated voltage to zero, results in:

$$V_{CSS} = \frac{T_{ON}}{T_{OFF}} V_0 = \frac{(DC)}{(1 - DC)} V_0 \qquad (2)$$

where the symbol $V_{CSS}$ represents the required value of $V_C$ for preventing core saturation during steady state operations and the symbol DC represents the given duty cycle.

To keep the voltage $V_C$ on storage capacitor 3034 at the required value $V_{CSS}$ under the conditions of constant input voltage, constant output voltage, and constant output load current, the flow of charge into storage capacitor 3034 during the first half of the OFF-period must be equal to the flow of charge out of storage capacitor 3034 during the second half of the OFF-period so that no net accumulation or depletion of charge occurs on storage capacitor 3034 during the OFF-period. Given that the magnetizing current $I_M$ increases at a constant rate during the ON-period, that $I_M$ decreases at a constant rate during the OFF-period and that $I_M$ is continuous, the waveform for the magnetizing current $I_M$ must be centered around a value of zero amperes in order to prevent a net charge accumulation or depletion on storage capacitor 3034 during the OFF-period. Otherwise, the voltage $V_C$ would shift away from the required $V_{CSS}$ value.

If the $I_M$ waveform is not centered around zero amperes, the voltage $V_C$ departs from the value $V_{CSS}$ in order to shift the $I_M$ waveform so that it is centered around zero amperes. For example, if the $I_M$ waveform is initially shifted upwards and centered around a positive current value, the shifted waveform will cause a net charge to flow into storage capacitor $C_C$, thereby raising the voltage $V_C$. In turn, the higher $V_C$ voltage causes the magnetizing current to decrease at a faster rate during the OFF-period, thereby shifting the $I_M$ waveform down to center the $I_M$ waveform around zero amperes within a finite number of switching cycles. Likewise, if the $I_M$ waveform is initially shifted downwards and centered around a negative current value, the shifted waveform will cause a net charge to flow out of storage capacitor $C_C$, thereby lowering the voltage $V_C$. In turn, the lower $V_C$ voltage causes the magnetizing current to decrease at a slower rate during the OFF-period, thereby shifting the $I_M$ waveform up to center the $I_M$ waveform around zero amperes within a finite number of switching cycles.

During power-up and during changing load conditions, the voltage value $V_{CSS}$ for storage capacitor 3034 is reached by the transient charging or discharging of storage capacitor 3034. If the voltage across storage capacitor 3034 is less than $V_{CSS}$, it takes a longer time duration to reverse the current-flow direction of $I_M$ and, consequently, more current flows into storage capacitor 3034 than flows out during the OFF-period. The net current flow into capacitor 3034 during each switching cycle raises the voltage across storage capacitor 3034 until the voltage $V_{CSS}$ is reached. Likewise, if the voltage on storage capacitor 3034 is greater than $V_{CSS}$, it takes a shorter time duration to reverse the current-flow direction of $I_M$ and, consequently, more current flows out of storage capacitor 3034 than flows in during the OFF-period. The net current flow out of capacitor 3034 during each switching cycle lowers the voltage across storage capacitor 3034 until the voltage $V_{CSS}$ is reached. During this transient charging condition, the waveform for the magnetizing current is not centered around a value of zero amperes.

The energy transferred out of storage capacitor 3034 during the latter part of the OFF-period is recycled to voltage source 3010. The reversal of current flow in the magnetizing current $I_M$ though inductor 3023 serves to reset the magnetic flux in the transformer's core at a point inside the third quadrant of the transformer's B-H characteristic. The utilization of the third quadrant in this manner increases the utilization of the transformer's core and, hence, the structure of transformer 3020 may be re-designed to decrease the dissipation losses in transformer 3020, as described above.

The steady-state waveforms for the key voltages and currents of forward converter 3000 are shown in timing diagram 4000 in FIG. 4. For the purposes of this discussion, each winding of transformer 3020 has the same number of turns and has no parasitic resistance and transformer 3020 is operated in the linear regime of its B-H characteristic. Additionally, each rectifier has a nominal voltage drop for forward conducting current, near zero current conduction for reverse applied voltage and has a nominal amount of reverse-recovery current. To simplify the discussion of forward converter 3000, the output voltage across load 3074 is taken to be constant at a value of $V_0/3$. Furthermore, load 3074 is taken to be resistive in nature without loss of generality.

The operation of primary switch means 3040 is shown in graph 4001 in FIG. 4 and the operation of auxiliary switch means 3030 is shown in graph 4009 in FIG. 4. Graph 4001 is in the form of a time line which indicates the ON-periods where primary switch means 3040 ($S_{PR}$) is closed and the OFF-periods where primary switch means 3040 is open. Graph 4009 is also in the form of a time line and indicates when auxiliary switch means 3030 ($S_A$) is closed and when auxiliary switch means 3030 is open. An exemplary duty-cycle of 33.3%, which is consistent with an output voltage $V_{OUT}$ of $V_0/3$, is shown for primary switch means 3040 ($S_{PR}$) in graph 4001.

The winding voltages $V_P$ and $V_S$ and the voltage $V_1$ are shown in graph 4002 in FIG. 4. For the primary circuit, the total primary current $I_P$ and the current $I_{CS}$ into capacitor $C_S$ are shown in graph 4003, the magnetizing current $I_M$ in inductor 3023 and the current $I_1$ in primary winding 3022 are shown in graph 4004, and the current $I_{CC}$ flowing into storage capacitor 3034 is shown in graph 4005 in FIG. 4. For the secondary circuit, the output voltage $V_{OUT}$ at load 3074 and the voltage $V_2$ are shown in graph 4006, the currents $I_{CR1}$ and $I_{CR2}$ in rectifiers 3050 (CR1) and 3060 (CR2) are shown in graph 4007, and the current $I_{LOUT}$ in choke inductor 3070 and the current $I_{LOAD}$ in load 3074 are shown in graph 4008 in FIG. 4. In comparing the rectifier currents in graph 4007 against the inductor current $I_{LOUT}$ in graph 4008, it may be seen that the rectifier current $I_{CR1}$ supports the inductor current $I_{LOUT}$ during the ON-periods and that the rectifier current $I_{CR2}$ supports the inductor current $I_{LOUT}$ during the OFF-periods.

During the ON-period, the voltage across primary winding 3022 and secondary winding 3024 is set by voltage source 3010 at a value of $V_0$ with the voltage $V_1$ across primary switch means 3040 at near zero volts, as shown in graph 4002. The application of $V_0$ across the secondary winding causes rectifier 3050 (CR1) to fully support the current in choke inductor 3070. Via the transformer action of transformer 3020, the rectifier current $I_{CR1}$ is replicated in the current $I_1$ of primary winding 3022, as shown in graph 4004. Also during the ON-period, the magnetizing current $I_M$ increases at a constant rate determined by the voltage applied across inductor 3023 and the magnetizing inductance of inductor 3023, as also shown in graph 4004. As discussed above, the magnetizing current during steady-state conditions is centered around a value of zero amperes, as shown in graph 4004. The total primary current $I_P$ is equal to the sum of $I_1$ and $I_M$ and is shown in graph 4003. During the ON-period, auxiliary switch means 3030 is open and, as such, and the current $I_{CC}$ into capacitor 3034 is zero, as shown in graph 4005.

As switch means 3040 opens to being the OFF-period, auxiliary switch means 3030 begins to close. During this switching transition, the magnetizing current in inductor 3023 initially flows into capacitor 3032 ($C_S$) and raises the voltage $V_1$ towards the voltage on capacitor 3034. Once auxiliary switch means 3030 closes, the magnetizing current in inductor 3023 flows into storage capacitor 3034. As mentioned above, the capacitance value of storage capacitance 3034 is sufficiently large so that the voltage across capacitor 3034 does not substantially change during the duration of the OFF-period. For an exemplary duty-cycle of 33.3%, the steady-state voltage on storage capacitor 3034 is equal to $V_0/2$, where $V_0$ is the value of voltage source 3010. This value is given by equation (2) above.

The application of $-V_0/2$ volts across primary winding 3022 and secondary winding 3024 by storage capacitor 3034 causes rectifier 3060 (CR2) to fully support the current in choke inductor 3070, as shown in graph 4007. As a result, the current in secondary winding 3024 ceases, as shown by $I_{CR1}$ in graph 4007, and the current in primary winding 3022 ceases, as shown by $I_1$ in graph 4004. Additionally, the magnetizing current $I_M$ in inductor 3023 decreases at a constant rate during the OFF-period, as shown by graph 4004. The magnetizing current $I_M$ initially flows into storage capacitor 3023. The rate of decrease in $I_M$ is equal in magnitude to half of the rate of increase in $I_M$ during the ON-period since the magnitude of applied voltage across inductor 3023 during the OFF-period is half the magnitude during the ON-period. Half way through the OFF-period, under steady-state conditions, $I_M$ reverses sign and flows out of storage capacitor 3023. The waveform of $I_M$ during the OFF-period is reflected in the waveforms for the total primary current $I_P$, as shown in graph 4003, and for the storage capacitor current $I_{CC}$, as shown in graph 4005.

Forward converter 3000 has two main advantages as compared with forward converter 1000 shown in FIG. 1. First, the waveform of magnetizing current $I_M$ is centered around zero amperes, indicating that the third quadrant of the transformer core's B-H characteristic is being utilized. This provides a larger range of linearity in the B-H characteristic, and hence the design of transformer 3020 can be optimized to lower the winding resistances and reduce power dissipation, as discussed above. Secondly, the voltage stress applied to the primary switch means 3040 during the OFF-period is reduced compared to that across primary switch means 1040 since the voltage applied to primary switch means 1040 during the OFF-period is equal to $3V_0/2$, assuming a 33.3% duty-cycle, rather than $2V_0$, as is the case for primary switch means 1040 of converter 1000. Forward converter 3000, however, does not address the power dissipation that occurs in primary switch means 3040 between the OFF and ON-periods, as discussed above. As can be seen in graphs 4002 and 4003 of FIG. 4, as converter 3000 switches from the OFF-period to the ON-period, the current $I_P$ through primary switch means 3040 is at a substantial negative value while the voltage $V_1$ across primary switch means 3040 is switching from $3V_0/2$ to zero volts.

To address this problem, an improvement to forward converter 3000 was proposed in 1987 by B. Carsten, "Design Tricks, Techniques and Tribulations at High Conversion Frequencies," HPFC, April 1987, p. 139. The proposed improvement uses the magnetizing current present in inductor 3023 during the end of the OFF-period to reduce the voltage at node $V_1$ by discharging stray (parasitic) capacitor 3032. Under some conditions, the voltage $V_1$ can be reduced to zero volts in this manner before primary switch means 3040 is closed, thereby significantly reducing the power dissipation in primary switch means 3040 during switching-on transitions. Under other conditions, however, the voltage $V_1$ can never be reduced to zero volts before primary switch means 3040 closes. As discussed below, the present invention identifies the causes which prevent zero voltage switching and provides means for overcoming these causes.

In this proposed improvement, a short delay period, or time duration, is introduced between the end of the OFF-period and the beginning of the ON-period where both primary switch means 3040 and auxiliary switch means 3030 remain open. This time period is shown at 4020 in FIG. 4 and is referred to as delay period 4020 for the purposes of this discussion. As can be seen in graph 4004, the magnetizing current $I_P$ through inductor 3023 is negative at the beginning of delay period 4020. Since both switch means 3040 and 3030 are open, no definite voltage is applied across inductor 3023 and primary winding 3022. Under this condition, the magnetizing current $I_M$ begins to flow through stray capacitor 3032, thereby reducing the voltage $V_1$ from $3V_0/2$ towards zero volts.

The magnetizing current continues to reduce the voltage $V_1$ until the voltage $V_1$ reaches a value of $V_0$. At this point, the voltages $V_P$ across primary winding 3022 and $V_S$ across secondary winding 3024 become positive and the secondary circuit begins conducting current through rectifier 3050 ($I_{CR1}$). Via transformer action, a current ($I_1$) flows in primary winding 3022 which is equal in magnitude to the current flowing in secondary winding 3024. This current flow in primary winding 3022 diverts some or all of the magnetizing current away from stray capacitor 3032. If the magnitude of the current in choke inductor 3070 is less than the magnitude of the magnetizing current $I_M$ at this point, a portion of the magnetizing current will continue to flow into stray capacitor 3032 and voltage $V_1$ will continue to be decreased. This portion of magnetizing current is equal to the magnetizing current less the current flowing in choke inductor 3070.

As the voltage $V_1$ is decreased, the applied voltage across primary winding 3022 and secondary winding 3024 increases, thereby increasing the current flow in choke inductor 3070 and secondary winding 3024. In turn, this increase in secondary current reduces the portion of magnetizing current which is flowing through stray capacitor 3032. At some point, the decrease in voltage $V_1$ ends because the current in secondary winding 3024 is increased to the point where it equals the magnetizing current in inductor 3023. Under certain load conditions and duty-cycles, it is possible to decrease the voltage $V_1$ to zero volts or less, thereby facilitating a zero-voltage-switching condition for primary switch means 3024. Such an exemplary case is shown in FIG. 4 where the voltage $V_1$ shown in graph 4002 is decreased to a negative value during delay period 4020.

However, it is also possible that the voltage $V_1$ cannot be reduced to zero volts due to the loading effects on secondary winding 3024. In some cases, the reduction of voltage $V_1$ ends at a positive voltage. More likely, however, the current through choke inductor 3070 is greater than the magnetizing current $I_M$ during the beginning of delay period 4020 and oftentimes throughout delay period 4020. In this case, the magnetizing current decreases voltage $V_1$ only to a value of $V_0$ volts, at which point all of the magnetizing current $I_M$ is diverted into secondary winding 3024, via primary winding 3022, and the voltage $V_1$ is clamped at a value of $V_0$. The remainder of the current flow in choke inductor 3070 is provided by rectifier 3060, which clamps voltage $V_2$ near zero volts. The current conduction in both rectifiers 3050 and 3060 clamps the secondary voltage $V_S$ to zero volts and, consequently, ensures that voltage $V_1$ remains at a value of $V_0$ volts. In this case, no zero-voltage switching is possible. Unfortunately, since forward converters are designed to maximize the current delivered to the load and to minimize the magnitude of magnetizing current, it is rarely possible to achieve a zero-voltage-switching condition because the load current is larger than the magnetizing current during the delay period.

The steady-state waveforms for the key voltages and currents of forward converter 3000 under the conditions where the current through choke inductor 3070 is greater than the magnetizing current during the delay period are shown in timing diagram 5000 in FIG. 5. Timing diagram 5000 comprises graphs 5001 through 5009 and a delay period 5020. Graphs 5001 through 5009 display the same information as graphs 4001 through 4009, respectively, as shown in FIG. 4. Once voltage $V_1$ is decreased to a value of $V_0$ volts at or near the beginning of delay period 5020, the current $I_{CR1}$ in secondary winding 3024 to zero volts since rectifier 3060 is still conducting. A voltage of zero volts is now applied to the windings of transformer 3020, and the magnetizing current is prevented from flowing into stray capacitor 3032. Instead, the magnetizing current, shown in graph 5004, is diverted in primary winding 3022, as shown by $I_1$ in graph 5004, which sets the current in secondary winding 3024 equal to the magnetizing current, as shown by $I_{CR1}$ in graph 5007. The remainder of the current $I_{LOUT}$ in choke inductor 3070, as shown in graph 5008, is conducted by rectifier 3060, as shown by $I_{CR2}$ in graph 5007. The voltage $V_1$ is thereby clamped at a value of $V_0$ volts and a zero-voltage-switching condition cannot be achieved.

The above described mechanism which diverts magnetizing current into secondary winding 3024 and resulting voltage clamping of the transformer windings during the delay period have thus far not been discussed nor addressed in the prior art. The present invention has recognized this diversion mechanism and clamping effect as a major hindrance to achieving a zero-voltage-switching condition for primary switch means 3040 in forward converter 3000 under all loading conditions. As discussed below, the present invention seeks to eliminate the diversion of magnetizing current and the resulting voltage clamping during the delay period, thereby permitting voltage $V_1$ to decrease to zero volts to provide a zero-voltage-switching condition for the primary switch means.

The forward converter according to the present invention is shown at 100 in FIG. 6. Forward converter 100 comprises a voltage source 110 ($V_0$) for providing electrical energy, a transformer 120 (T1) having a primary winding 122 and secondary winding 124, and a primary switch means 140 ($S_{PR}$) coupled in series with primary winding 122 and voltage source 110 for selectively coupling energy from voltage source 110 to transformer 120. Forward converter 100 further comprises a storage capacitor 134 ($C_C$) and a first switch means 130 ($S_1$) for selectively controlling the current flow through storage capacitor 134. First switch means 130 and storage capacitor 134 are coupled in series and the resulting series combination is coupled in parallel with either the primary winding of transformer 120 (as shown in FIG. 6) or the secondary winding of transformer 120 (not shown). Additionally, converter 100 includes a capacitor 132 ($C_S$) coupled between the switched terminal of primary winding 122 and ground for representing the combined stray (parasitic) capacitances of primary winding 122, primary switch means 140, and first switch means 130. It may be appreciated that each of primary winding 122, primary switch means 140, and first switch means 130 may include a parasitic capacitance, resulting from the non-ideal elements used in implementing each of these components. The parasitic capacitance of each of these components may, for example, be represented by a parasitic capacitor for each component terminal, each parasitic capacitor being coupled between its respective component terminal and ground. As these capacitances are parasitic in nature, their exact values are not precisely known and may, in fact, vary considerably in manufacturing. In a further embodiment of the present invention, capacitor 132 further comprises a fixed-value capacitor in addition to the parasitic capacitances so as to provide a more predictable capacitance value for capacitor 132, thereby increasing the manufacturing consistency of converter 100.

As discussed above with reference to converters 1000 and 3000, an imaginary inductor is used to model the effects of the magnetizing energy of transformer 120. The modeling inductor is indicated in phantom as inductor 123 in FIG. 6 and is coupled in parallel with primary winding 122. As such, the magnetizing effects of transformer 120 can be readily analyzed in the form of a magnetizing current. The use of modeling inductor 123 in this manner is well known to the transformer art and not a real component of converter 100, but rather an imaginary modeling component which aids in explaining the characteristic behavior of the magnetizing energy in real transformer 120.

For directing and controlling the flow of power from transformer 120 to an output load 174, forward converter 100 further comprises a second switch means 150 coupled in series with the secondary winding for controlling the flow of current to load 174, and a rectifier 160 (CR2) coupled in parallel with the series combination of second switch means 150 and secondary winding 124. Converter 100 further includes a choke inductor 170 ($L_{OUT}$) coupled between second switch means 150 and load 174, and a load capacitor 172 ($C_{OUT}$) coupled in parallel with load 174. The current through load 174 is represented by the symbol $I_{LOAD}$ and, for the purposes of discussion and without loss of generality, is taken to be constant. Choke inductor 170 ($L_{OUT}$) and load capacitor 172 ($C_{OUT}$) provide means for filtering the power delivered to load 174.

Forward converter 100 further comprises a switch control means 180 for generating signals to control the operation of primary switch means 140, first switch means 130, and second switch means 150. Switch control means 180 comprises a port 181 coupled to primary switch means 140, a port 182 coupled to first switch means 130, and a port 183 coupled to second switch means 150. Port 181 transmits a signal which controls the operation of primary switch means 140, port 182 transmits a signal which controls the operation of first switch means 130, and port 183 transmits a signal which controls the operation of second switch means 150.

Certain voltages and currents in converter 100 are significant and their symbolic notations are detailed below with reference to FIG. 6. The voltage across primary winding 122 is designated as $V_P$, and the voltage across secondary winding 124 is designated as $V_S$. Each of these winding voltages is referenced such that the positive terminal coincides with the magnetic reference dot shown in FIG. 6. There are two node voltages of significance. At the node coupling the negative terminal of primary winding 122 to primary switch means 140, the voltage at this node with respect to the negative terminal of voltage source 110 is designated as $V_1$ and the node itself is referred to as node $V_1$. At the node coupling second switch means 150 and rectifier 160 to choke inductor 170, the voltage at this node with respect to the negative terminal of secondary winding 124 is designated as $V_2$ and the node itself is referred to as node $V_2$.

The following currents in converter 100 are significant. The current flowing into primary winding 122 at the positive terminal is designated as $I_1$, the current flowing into inductor 123 from voltage source 110 is designated as $I_M$, and the total primary current flowing into both inductor 123 and winding 122 from voltage source 110 is designated as $I_P$. The current flowing into stray capacitor 132 ($C_S$) from node $V_1$ is designated as $I_{CS}$ and the current flowing into storage capacitor 134 ($C_C$) from node $V_1$ is designated as $I_{CC}$. The current flowing into second switch means 150 from secondary winding 124 is designated as $I_{S2}$ and the current flowing out of the cathode terminal of rectifier 160 is designated as $I_{CR2}$. The current flowing through choke inductor 170 ($L_{OUT}$) is designated by the current reference designation $I_{LOUT}$, where the current reference flows toward load 174. The current flowing through load 174 is designated by the current reference designation $I_{LOAD}$, where the current reference flows from choke inductor 170 to ground.

For the purposes of discussion and without loss of generality, primary winding 122 and secondary winding 124 are taken to have the same number of turns. The dot notations for windings 122 and 124 indicate their polarities. An inductor 123 ($L_M$) is included, in phantom, in the circuit diagram for transformer 120 to model the effects of the magnetizing flux and magnetizing current of transformer 120, as discussed above. As mentioned above, a magnetizing current must be provided to one of windings of a real transformer to provide the magnetomotive force required to overcome the magnetic reluctance of the transformer's core. For a real transformer, the magnetizing current can be electrically modeled by a phantom inductor coupled in parallel with the primary winding of an ideal transformer, as shown by inductor 123. As such, the above mentioned current $I_P$ represents the current flowing into the primary winding of a real transformer, such as transformer 120, the above mentioned current $I_M$ represents the component of primary current $I_P$ needed to overcome the magnetic reluctance of the real transformer, and the above mentioned current $I_1$ represents the component of primary current $I_P$ which is actually transformed over to the secondary winding of the real transformer.

As with forward converter 3000, the operation of forward converter 100 is governed by primary switch means 140, which causes converter 100 to enter an ON-period when switch means 140 is closed and to enter an OFF-period when switch means 140 is open. First switch means 130 operates substantially counter to primary switch means 140 by closing substantially when primary switch means 140 opens to start an OFF-period and by opening prior to when primary switch means 140 closes to start an ON-period. Second switch means 150 operates substantially synchronously with primary switch means 140 by closing substantially when primary switch means 140 closes and by opening substantially when primary switch means 140 opens. The operation of converter 100 is explained in greater detail below with the assumption that the voltage at the positive terminal of capacitor 134 with respect to ground is greater than $V_0$, which is the voltage value of voltage source 110.

The operations of first switch means 130 and second switch means 150 are discussed in greater detail with reference to a timing diagram shown at 200 in FIG. 7, which shows the timing requirements for the operations of first and second switch means 130,150 with respect primary switch means 140. A single switching cycle having an ON-period followed by an OFF-period is shown in graph 201. The opening and closing operations of primary switch means 140, which define the ON- and OFF-periods, is shown in graph 205 in FIG. 7. The high sections of graph 205 indicate the time durations where primary switch means 140 is closed and the low sections indicate the time durations where primary switch means 140 is open. The operation and timing requirements for first switch means 130 is shown in graph 210 and the operation and timing requirements for second switch means 150 is shown in graph 220 in FIG. 7.

Shown in graph 210 is a timing window 212 in which switch control means 180 closes first switch means 130. Timing window 212, as well as all other timing windows shown in Timing Diagram 200, is illustrated using a series of parallel skew lines (/). In the preferred embodiment of the present invention, timing window 212 is of a predetermined length and immediately follows the end of the ON-period. Timing window 212 does not preferably intersect with the ON-period. This is because, as discussed in greater detail below, the delay in closing first switch means 130 with respect to the opening of primary switch means 140 may be used to create a zero-voltage-switching condition for first switch means 130.

Also shown in graph 210 is a predetermined time delay 214 in which first switch means 130 is opened before primary switch means 140 is closed. As discussed below in greater detail, the time delay in closing first switch means 130 with respect to the opening of primary switch means 140 in timing window 212 may be used to provide a zero-voltage-switching condition for first switch means 130 and the time delay 214 between the opening of first switch means 130 and the closing of primary switch means 140 provides a zero-voltage-switching condition for primary switch means 140. As shown in graph 220, second switch means 150 is open during time delay 214 and, thereby, prevents the loading on secondary winding 124 from diverting the magnetizing current away from stray capacitor 132.

Shown in graph 220 is a timing window 222 in which switch control means 180 closes second switch means 150. In the preferred embodiment of the present invention, timing window 222 is of a predetermined length and immediately follows the end of the OFF-period. Timing window 222 preferably does not intersect with the OFF-period. This is because, as discussed in greater detail below, the delay in closing second switch means 150 with respect to the closing of primary switch means 140 may be used to allow primary switch means 140 to reach a full conduction state before primary switch means 140 has to conduct the reflected secondary current, thereby preventing an excessive secondary load current from pulling primary switch means 140 out of a zero-voltage switching condition.

Also shown in graph 220 is a timing window 224 in which switch control means 180 opens second switch means 150. In the preferred embodiment of the present invention, timing window 224 is of a predetermined length which starts during the ON-period and ends before the closing of first switch means 130 in timing window 212. Typically, second switch means 150 is opened synchronously with the opening of primary switch means 140. However, as discussed in greater detail below, the opening of second switch means 150 after the opening of primary switch means 140 may be used to direct the current in secondary winding 124, as reflected in primary winding 122, into stray capacitor 132 before first switch means 130 is closed. This reduces the amount of magnetizing current required to charge capacitor 132 and is useful at low duty-cycle conditions where the magnitude of the magnetizing current is small. As a result of conserving the magnetizing current at low duty-cycles, the range of duty-cycles over which a zero-voltage-switching condition for primary switch means 140 can occur is extended.

In the alternative, second switch means 150 may be opened before the opening of primary switch means 140, as shown at the dotted line 226 in graph 220. This opening may be used to reduce the current in secondary winding 124 and the corresponding reflected current in primary winding 122 before primary switch means 140 is opened. In such a case, only the magnetizing current component remains in primary winding 122 when primary switch means 140 is opened, thereby reducing the power dissipation and current stresses on primary switch means 140. The reduction of such stresses is important during high-load (i.e., high duty-cycle) conditions. Therefore, the opening of second switch means 150 in timing window 224 may be varied to minimize the power dissipation losses in primary switch means 140.

Also shown in Timing Diagram 200 is a first switching-event sequence 230 and a second switching-event sequence 240, which are used later with reference to FIGS. 8 and 9 in discussing the operation of converter 100. Sequences 230 and 240 each divides a single switching cycle into six continuous, non-overlapping segments: segments 1, 2, 3, 4, 5, and 6 for sequence 230 and segments 1, 2', 3', 4', 5 and 6 for sequence 240. The boundary of each segment is defined by a switching event in one of the switch means, 130, 140, and 150. Sequence 230 corresponds to the case where second switch means 150 is opened after primary switch means 140 is opened, as shown in window 224, and sequence 240 corresponds to the case where second switch means 150 is opened before primary switch means 140 is opened, as indicated by line 226.

Exemplary qualitative steady-state waveforms for the key voltages and currents of forward converter 100 under switching-event sequences 230 and 240 are shown in a timing diagram 300 in FIG. 8 and a timing diagram 400 in FIG. 9, respectively. For the purposes of this discussion and without loss of generality, it is assumed that each winding of transformer 120 has the same number of turns and has no parasitic resistance and transformer 120 is operated in the linear regime of its B-H characteristic. Additionally, rectifier 160 has a nominal voltage drop for forward conducting current, a near zero current conduction for reverse applied voltage and a nominal amount of reverse-recovery current. To simplify the discussion of forward converter 100 and without loss of generality, the output voltage across load 174 is taken to be constant at a value of approximately $V_0/3$ and the voltage on storage capacitor 134 is taken to be substantially constant at a value of approximately $V_0/2$. Without loss of generality, load 174 is taken to be resistive in nature and an exemplary duty-cycle of 33.3%, which is consistent with an output voltage $V_{OUT}$ of $V_0/3$, is used for primary switch means 140.

In FIG. 8, the operation of primary switch means 140 is shown in graph 301, the operation of first switch means 130 is shown in graph 302, and the operation of second switch means 150 is shown in graph 303. Graphs 301–303 are each in the form of a time line waveform which indicates that its corresponding switch means is closed when the waveform is high and that its corresponding switch means is open when the waveform is low. Sequence 230 of FIG. 7 is reproduced as sequence 304 in FIG. 8. Likewise, in FIG. 9, the operation of primary switch means 140 is shown in graph 401, the operation of first switch means 130 is shown in graph 402, and the operation of second switch means 150 is shown in graph 403. Graphs 401–403 are each in the form of a time line waveform which indicates that its corresponding switch means is closed when the waveform is high and its corresponding switch means is open when the waveform is low. Sequence 240 of FIG. 7 is reproduced as sequence 404 in FIG. 9. In order to more easily show the transitions of key voltages and current during segments 1, 3/3', 4/4' and 6, the time-scale during each of these segments is expanded by roughly an order of magnitude with respect the time-scale used during segments 2/2', and 5 (i.e., the waveforms are "stretched out" during segments 1, 3/3', 4/4' and 6).

In FIG. 8, the winding voltages $V_P$ and $V_S$ and the voltage $V_1$ are shown in graph 310. For the primary circuit, the total primary current $I_P$ and the current $I_{CS}$ into capacitor $C_S$ are shown in graph 320, the magnetizing current $I_M$ in inductor 123 and the current $I_1$ in primary winding 122 are shown in graph 330, and the current $I_{CC}$ flowing into storage capacitor 134 is shown in graph 340 in FIG. 8. For the secondary circuit, the output voltage $V_{OUT}$ at load 174 and the voltage $V_2$ are shown in graph 350, the currents $I_{S2}$ and $I_{CR2}$ in second switch means 150 and rectifier 160 (CR2) are shown in graph 360, and the current $I_{LOUT}$ in choke inductor 170 and the current $I_{LOAD}$ in load 174 are shown in graph 370 in FIG. 8.

Likewise in FIG. 9, the winding voltages $V_P$ and $V_S$ and the voltage $V_1$ are shown in graph 410. For the primary circuit, the total primary current $I_P$ and the current $I_{CS}$ into capacitor $C_S$ are shown in graph 420, the magnetizing current $I_M$ in inductor 123 and the current $I_1$ in primary winding 122 are shown in graph 430, and the current $I_{CC}$ flowing into storage capacitor 134 is shown in graph 440 in FIG. 9. For the secondary circuit, the output voltage $V_{OUT}$ at load 174 and the voltage $V_2$ are shown in graph 450, the currents $I_{S2}$ and $I_{CR2}$ in second switch means 150 and rectifier 160 (CR2) are shown in graph 460, and the current $I_{LOUT}$ in choke inductor 170 and the current $I_{LOAD}$ in load 174 are shown in graph 470 in FIG. 9.

During segment 1 of sequences 230 (cf., FIG. 8) and 240 (cf., FIG. 9), primary switch means 140 is closed and both first switch means 130 and second switch means 150 are open. As discussed below, the voltage across primary switch means 140 has been driven to substantially zero volts in the preceding segment, segment 6, and a zero-voltage-switching condition exists across primary switch means 140 when it closes. The zero-voltage-switching condition is shown at 311 and 313 of graph 310 in FIG. 8 and at 411 and 413 of graph 410 in FIG. 9. During segment 1, a voltage of $V_0$ appears across primary winding 122, secondary winding 124, and magnetizing inductor 123. In this segment, only the magnetizing current $I_M$ flows in inductor 123 and primary switch means 140, since second switch means 150 is open. The magnetizing current increases at a constant rate and, as in converter 3000, increases from a negative value.

In a preferred embodiment of the present invention, primary switch means 140 comprises a transistor switching device and the duration segment 1 is sufficiently long to allow the transistor switching device to reach a full conducting state (i.e., lowest conducting resistance) after being switched on at the beginning of segment 1. The conduction of current in secondary 124 is held off until segment 2/2', at which time the transistor switching device of primary switch means 140 has lowered its ON-resistance to the point that the addition of the reflected secondary current will not substantially raise the voltage across the device's conducting terminals and, hence, will not increase the power dissipation in the device.

During segment 2 of sequence 230 (cf., FIG. 8) and segment 2' of sequence 240 (cf., FIG. 9), second switch means 150 is closed. During segments 2 and 2', the voltage of $V_0$ appearing across secondary winding 124 and the closing of switch means 150 causes a current to flow through secondary winding 124 and a corresponding current to flow in primary winding 122, due to transformer action. The magnetizing current in inductor 123 continues to increase at a constant rate due to the application of a constant voltage $V_0$ across inductor 123 by voltage source 110. During this segment, power is transferred to the secondary circuit from the primary circuit.

In sequence 230 (cf., FIG. 8), the power transfer continues until primary switch means 140 is opened, when segment 3 begins. During segment 3, the magnetizing current $I_M$ flows into stray capacitor 132, shown in FIG. 6. This flow raises the voltage $V_1$ and, at the same time, lowers the voltage across primary winding 122 and secondary winding 124. The current in secondary winding 124 is governed by choke inductor 170 and continues to flow because the voltage across secondary winding 124, $V_S$, continues to be positive. The positive value for $V_S$ prevents rectifier 160 from conducting the current in choke inductor 170. As a result, the secondary current continues to be reflected in primary winding 122, which adds constructively with the magnetizing current $I_M$ to charge stray capacitor 132.

The voltage across stray capacitor 132 continues to rise during segment 3 (cf., FIG. 8) until it reaches a value of $V_0$ volts, at which time second switch means 150 is opened to start segment 4. If second switch means 150 is not opened when the voltage $V_1$ across stray capacitor 132 reaches $V_0$ volts, the voltage $V_S$ across secondary winding 124 would be clamped to substantially zero volts by rectifier 160. As a result, the voltage $V_1$ would be clamped to $V_0$ volts and the magnetizing current would be diverted to secondary winding 124. In segment 4, the magnetizing current $I_M$ continues to charge stray capacitor 132 until the voltage $V_1$ substantially reaches the voltage on the positive terminal of storage capacitor 134 at the end of segment 4. First switch means 130 may then be closed with zero volts across its conduction terminals, a zero-voltage-switching condition, to start segment 5. In FIG. 8, the zero-voltage-switching condition for switch means 130 is shown at 312 in graph 310, where voltage $V_1$ reaches the voltage on the positive terminal of storage capacitor 134. For an exemplary duty-cycle of 33.3%, the voltage on the positive terminal of storage capacitor 134 is equal to $3/2V_0$.

For sequence 240 (cf., FIG. 9), the power transfer continues during segment 2' until second switch means 150 is opened. The opening ends segment 2' and beings segment 3'. During segment 3', the reflection of secondary current in primary winding 122 ends. The magnetizing current $I_M$, however, continues to flow and increases in value due to the continuing application of $V_0$ volts across magnetizing inductance 123. Nonetheless, the current in primary switch means 140 is significantly reduced so that primary switch means 140 may be opened with lower current stress and lower power dissipation. This opening of primary switch means 140 ends segment 3' and begins segment 4'.

During segment 4' (cf., FIG. 9), the magnetizing current $I_M$ flows into stray capacitor 132, which raises the voltage $V_1$. Segment 4' ends when the voltage $V_1$ substantially reaches the voltage on the positive terminal of storage capacitor 134. At the end of segment 4', first switch means 130 may be closed with zero volts across its conduction terminals, a zero-voltage-switching condition, to start segment 5. In FIG. 9, the zero-voltage-switching condition is shown at 412 in graph 410, where voltage $V_1$ reaches the voltage on the positive terminal of storage capacitor 134. For an exemplary duty-cycle of 33.3%, the voltage on the positive terminal of storage capacitor 134 is equal to $3/2V_0$.

During segment 5 for both sequences 230 (cf., FIG. 8) and 240 (cf., FIG. 9), primary switch means 140 and second switch means 150 are opened and first switch means 130 is closed. The voltage across primary winding 122 and secondary winding 124 is set at a negative value equal to the voltage $V_C$ across storage capacitor 134, approximately $-V_0/2$. The magnetizing current $I_M$ is diverted away from charging stray capacitor 132 and flows into storage capacitor 134. In the preferred embodiment of the present invention and without loss of generality, the capacitance of storage capacitor 134 is large enough so that the voltage across storage capacitor 134 does not substantially change during segment 5. (The zero-voltage switching on primary switch means 140 and the other benefits of the present invention could be maintained with smaller capacitance values for storage capacitor 134, even though this would cause voltage variations across capacitor 134 during segment 5.) Since a constant negative voltage is being applied to inductor 123 during segment 5, the magnetizing current $I_M$ decreases at a constant rate, thereby acting to reset the transformer core. The duration of segment 5 is sufficiently long that the magnetizing current $I_M$ reverses direction and flows out of storage capacitor 134 into voltage source 110. The magnitude of the current flow $I_M$ out of storage capacitor 134 continues to grow until first switch means 130 opens, at which time segment 6 begins.

In segment 6, the magnetizing current is diverted away from storage capacitor 134 towards stray capacitor 132, where it discharges stray capacitor 132. As a result, the voltage $V_1$ is reduced in value towards zero volts. Unlike converter 3000, the secondary circuit in converter 100 is prevented from interfering with the discharging of stray capacitor 132 since second switch means 150 is opened during segment 6. At the end of segment 6, voltage $V_1$ is decreased to a value of zero volts and primary switch means 140 is closed with a zero-voltage-switching condition to start segment 1. Given the small capacitance value of stray capacitor 132 and the typically large magnitude value of the magnetizing current $I_M$ during segment 6, the magnitude of $I_M$ only decreases slightly during segment 6.

As in forward converter 3000, the time-integrated voltage across inductor 123 should be zero for each switching cycle during the steady-state operation of converter 100 to prevent the core of transformer 120 from saturating. In the steady-state operation of converter 100, the voltage $V_C$ across capacitor 134 is at a value which sets the time-integrated voltage across inductor 123 to zero during each switching cycle. This value is referred to as the required value for $V_C$ which prevents core saturation and is similar to the required value $V_{CSS}$ determined for forward converter 3000. Given the additional segments present for converter 100, specifically segments 1, 3/3', 4/4' and 6, the calculation of the exact value for $V_{CSS}$ is more complex. In practice, however, the duration of segments 1, 3/3', 4/4' and 6 are extremely small compared to the duration of segments 2/2' and 5, and the above equation (2) for $V_{CSS}$ in converter 3000 serves as a good approximation for $V_{CSS}$ in converter 100.

To keep the voltage $V_C$ on storage capacitor 134 at the required value $V_{CSS}$ under the conditions of constant input voltage, constant output voltage, and constant output load current, the flow of charge into storage capacitor 134 during the first half of segment 5 must be equal to the flow of charge out of storage capacitor 134 during the second half of segment 5 so that no net accumulation or depletion of charge occurs on storage capacitor 134 during the OFF-period. As discussed above, this same requirement was found for converter 3000. As in converter 3000, the waveform for the magnetizing current $I_M$ in converter 100 under steady-state conditions is centered around a value of zero amperes in order to prevent a net charge accumulation or depletion on storage capacitor 134 during the OFF-period. Otherwise, the voltage $V_C$ would shift away from the required $V_{CSS}$ value.

As found in converter 3000, the voltage $V_C$ and the magnetizing current $I_M$ interact so as to center the $I_M$ waveform around a value of substantially zero amperes. Additionally, the voltage value $C_{CSS}$ for storage capacitor 134 is reached during power-up conditions by transient charging or discharging of storage capacitor 134 in the same manner found in converter 3000. Also, the energy transferred out of storage capacitor 134 during the latter part of segment 5 is recycled to voltage source 110. The reversal of current flow in the magnetizing current $I_M$ though inductor 123 serves to reset the magnetic flux in the transformer's core at a point inside the third quadrant of the transformer's B-H characteristic.

The following exemplary component parameters and operating conditions of converter 100 are provided as an aid in practicing the present invention. In an exemplary embodiment of the present invention, the input voltage ($V_0$) is set at 300 V to deliver a typical output current of 1.0 A at an output voltage ($V_{OUT}$) of approximately 100 V. A switching frequency of 400 kHz is used in this exemplary embodiment with a typical duty-cycle of approximately 45%. Primary switch means 140 comprises a field-effect transistor having a breakdown voltage of 800 V and an on-resistance of 3 ohms (part number IRFBE30 from International Rectifier Corporation), first switch means 130 comprises a field-effect transistor having a breakdown voltage of 800 V and an on-resistance of 6 ohms (part number IRFBE20 from International Rectifier Corporation), and second switch means 150 comprises a field-effect transistor having a breakdown of 600 V and an on-resistance of 2.2 ohms (part number IRFBC30 from International Rectifier Corporation). In this exemplary embodiment, storage capacitor 134 ($C_C$) has a capacitance of approximately 2200 pF, stray capacitor 132 ($C_S$) has a capacitance of approximately 140 pF, and transformer 120 has an effective magnetizing inductance ($L_M$ of inductor 123) of approximately 600 μH. With this value of magnetizing inductance and under the above operating conditions, the magnetizing current has a peak-to-peak value of approximately 0.6 A.

It may now be appreciated that the following modifications of forward converter 100 shown in FIG. 6 are equivalent to the specific topology shown in FIG. 6. First, it may be appreciated that the series combination of storage capacitor 134 and first switch means 130 may be coupled in parallel with secondary winding 124 instead of primary winding 122. This equivalence is pointed out in U.S. Pat. No. 4,441,146 issued to Vinciarelli. In the present invention, the coupling of the series combination must be placed before second switch means 150. Second, it may be appreciated that the negative terminal of storage capacitor 134 may be coupled to any constant voltage reference, such as ground. Third, it may be appreciated that the positions of storage capacitor 134 and first switch means 130 in the series combination may be reversed. Fourth, it may be appreciated that rectifier 160, choke inductor 170, and output capacitor 172 are not essential in providing zero-voltage-switching conditions for primary switch means 140 and for first switch means 130.

It may be appreciated that switch control means 180 shown in FIG. 6 may comprise a digital microprocessor for generating the control signals for primary switch means 140, first switch means 130, and second switch means 150 according to the timing constraints detailed in Timing Diagram 200 shown in FIG. 7. Given the inductance $L_M$ of the magnetizing inductor 123 and capacitance $C_S$ of stray capacitor 132, the duration of the segments 1, 2/2', 3/3', 4/4', 5 and 6 required for providing zero-voltage switching can be calculated as a function of duty-cycle for the steady-state operation of converter 100. These values may be stored in a conventional memory accessible to the microprocessor and the microprocessor may select the appropriate value for each segment as dictated by the then current value of the duty-cycle.

In a further microprocessor-based embodiment of switch control means 180, it may be appreciated that active voltage sensors may be coupled to primary switch means 140 and first switch means 130 for detecting zero-voltage conditions across their respective switch means. The microprocessor of switch control means 180 may then use this information in setting the duration of segments 3/3', 4/4' and 6 rather than using predetermined stored value for such segments. The advantage of this more active approach is that the zero-voltage-switching conditions may be achieved in transient conditions as well as steady-state conditions. Additionally, the zero-voltage-switching conditions are no longer dependent on knowing the exact values for $L_M$ and $C_{CS}$. As a result, forward converter 100 may be constructed with components having wider parameter ranges and tolerances, leading to higher yields and lower unit costs in the manufacturing of forward converter 100.

Similar benefits may be achieved with the following embodiments of primary switch means 140 and first switch means 130 shown at 540 and 530, respectively, in FIG. 10. Embodiments 540 and 530 are shown in the context of a partial block diagram 500 of forward converter 100, which is shown in FIG. 6. Primary switch means 540 comprises a parallel combination of a rectifier 541 and a switch means 542. Primary switch means 540 is oriented in forward converter 100 such that rectifier 541 conducts a current directed from the negative terminal of voltage source 110 to the positive terminal of voltage source 110 (e.g., the cathode of rectifier 541 is coupled to voltage node $V_1$). Similarly, first switch means 530 comprises a parallel combination of a rectifier 531 and a switch means 532. First switch means 530 is oriented in forward converter 100 such that rectifier 531 conducts a current directed from voltage node $V_1$ to storage capacitor 134 (e.g., the anode of rectifier 531 is coupled to voltage node $V_1$).

With reference to Timing Diagrams 300 and 400 shown in FIGS. 8 and 9, respectively, the following properties of operation for rectifiers 541 and 531 in converter 100 are discussed below. Rectifier 541 conducts current from voltage source 110 to the node $V_1$ when the voltage between node $V_1$ and the negative terminal of voltage source 110 becomes zero or negative. In Timing Diagrams 300 and 400 shown in FIGS. 8 and 9, this condition occurs when voltage $V_1$ is driven to zero volts in segment 6, as shown at points 311 and 313. Thus, the current in primary switch means 540 may be conducted by rectifier 541 during the first part of segment 1 and, possibly, segment 2/2', if switch means 542 is not closed. If switch means 542 remains open, rectifier 541 will continue to conduct current during segments 1 and 6 as long as the primary current, shown at graph 320 in FIG. 8 and 420 in FIG. 9, remains negative. Thus, the incorporation of rectifier 541 with switch means 540 provides a relatively wide window in which switch means 542 may be closed with respect to the opening of first switch means 530.

Likewise, rectifier 531 conducts current from node $V_1$ to the positive terminal of storage capacitor 134 when the voltage at node $V_1$ is equal to or greater than the voltage at the positive terminal of capacitor 134. In Timing diagrams 300 and 400 shown in FIGS. 8 and 9, this condition occurs when the voltage $V_1$ is being driven to a high positive voltage at the end of segments 4/4' by the magnetizing current $I_M$, as shown at 312 and 412, respectively. Thus, if switch means 532 is not closed, the current in first switch means 530 may be conducted by rectifier 531 during the first part of segment 5 since the direction of the magnetizing current is the same as the conducting direction of rectifier 531, as shown at graphs 330,340 and 430,440 in FIGS. 8 and 9. If switch means 532 remains open during segment 5, rectifier 531 will continue to conduct the current through first switch means 530 until the magnetizing current $I_M$ reverses direction half-way through segment 5, assuming steady-state operating conditions. The closing of switch means 532 may then be delayed until the midpoint of segment 5, assuming steady-state operating conditions. Thus, the incorporation of rectifier 531 with switch means 530 provides a relatively wide window in which switch means 532 may be closed with respect to the opening of primary switch means 540.

In a broader viewpoint, rectifier 531 comprises means for detecting a zero-voltage-switching condition across first switch means 530 and means for initially conducting current through switch means 530 upon the occurrence of a zero-voltage-switching condition across switch means 530. Likewise, rectifier 541 comprises means for detecting a zero-voltage-switching condition across primary switch means 540 and means for initially conducting current through switch means 540 upon the occurrence of a zero-voltage-switching condition across switch means 540. As such, in this embodiment the timing for the closing of switch means 532 and switch means 542 is not as critical. The detecting and conducting means provided by rectifiers 531 and 541 may be used in a number of ways, as described below.

First, first switch means 530 and primary switch means 540 may be controlled by the microprocessor-based implementation of switch control means 180 discussed above, which determines the length of each segment as a function of the duty-cycle. In this embodiment, switch means 542 of primary switch means 540 is operated as shown in graph 205 in FIG. 7 and switch means 532 of first switch means 530 is operated as shown in graph 210 in FIG. 7. This implementation would ensure zero-voltage-switching conditions for steady-state operating conditions and for some, but not all, transient conditions and parameter variations. More specifically, zero-voltage switching would occurs for those transient conditions and parameter variations which would normally lead to a negative-voltage-switching condition on primary switch means 140 and positive-voltage-switching condition on first switch means 130 since rectifiers 541 and 531 would conduct under these conditions. Zero-voltage switching would not occur for those transient conditions and parameter variations which would normally lead to a positive-voltage-switching condition on primary switch means 140 and a negative-voltage-switching condition on first switch means 130, since rectifiers 541 and 531 would not conduct under these conditions. In these latter cases, the magnetizing current is not large enough in magnitude to reduce the voltage across switch means 530 and 540 to zero volts in the time interval (segment) allowed.

Second, by extending the amount of time for the magnetizing current to reduce the voltage across first switch means 530 to zero volts during segments 3 and 4/4' and the voltage across primary switch means 540 during segment 6, zero-voltage-switching can occur for the above latter cases. This may be accomplished by increasing the delay in closing switch means 532 (first switch means 530) after the opening of primary switch means 540, which is normally equal to the sum of segments 3 and 4/4', and by increasing the delay in closing switch means 542 (primary switch means 540) after the opening of first switch means 530, which is normally equal to the duration of segment 6. Under steady-state conditions and with parameter values at their target values, the increase of the delay in closing switch means 532 causes rectifier 531 to conduct and to initiate segment 5. Likewise, the increase of the delay in closing primary switch means 542 causes rectifier 541 to conduct and initiate segment 1. In this way, zero-voltage switching can occur in switch means 530 and 540 over a greater range of transient conditions and parameter variations.

Given the above exemplary use of switch means 530 and 540, it may be appreciated that switch means 530 and 540 may be used with an embodiment of switch control means 180 which is less complex than the above referenced microprocessor-based embodiment.

In another embodiment of the present invention, the delay in closing switch means 542 (primary switch means 540) after the opening of switch means 532 (first switch means 530) is set to a predetermined, fixed value. Since a fixed delay value is used, the calculation facilities of a microprocessor are no longer needed and less complex circuitry may be used for this exemplary embodiment of switch control means 180. The fixed delay value is applicable to a predetermined range of duty-cycles and is set to the longest time duration for segment 6 in the given range of duty-cycles. Assuming a steady-state operation for converter 100, the longest duration for segment 6 occurs for the lowest duty-cycle in the given range. Operating at the lowest duty-cycle value in the range, rectifier 541 begins to conduct at the same point switch means 542 is closed. As the duty-cycle increases with respect to the lowest value, rectifier 541 conducts prior to the closing of switch means 542 and provides for zero-voltage switching for primary switch means 540.

Likewise, the delay in closing switch means 532 (first switch means 530) after the opening of switch means 542 (first switch means 540) may be set to a predetermined, fixed value for a predetermined range of duty-cycles. In the case of sequence 230, shown in FIG. 7, the fixed delay value is set to the longest time duration of the sum of segments 3 and 4 in the given range of duty-cycles. Assuming a steady-state operation for converter 100, the longest duration for the sum of segments 3 and 4 occurs for the lowest duty-cycle in the given range. In the case of sequence 240, shown in FIG. 7, the fixed delay value is set to the longest time duration of segment 4' in the given range of duty-cycles. Assuming a steady-state operation for converter 100, the longest duration for segment 4' also occurs for the lowest duty-cycle in the given range. Operating at the lowest duty-cycle value in the range, rectifier 531 begins to conduct at the same point switch means 532 is closed. As the duty-cycle increases with respect to the lowest value, rectifier 531 conducts prior to the closing of switch means 532 and provides for zero-voltage switching for primary switch means 530.

It may be appreciated that given Timing Diagram 200 shown in FIG. 7, a practitioner of ordinary skill would be able to construct an embodiment of switch control means 180 which provides such fixed delay periods as described above. Such an fixed-delay embodiment of switch control means 180 is shown at 600 in FIG. 11. Switch control means 600 comprises an input port 601 for receiving a pulse-width modulated (PWM) duty-cycle signal, an output port 610 for providing a control signal for primary switch means $S_{PR}$ (540 or 140), an output port 611 for providing a control signal for first switch means $S_1$ (530 or 130), and an output port 612 for providing a control signal for second switch means $S_2$ (550 or 150). The input PWM duty-cycle signal to port 601 may be generated by means well known to the power-supply switching art and an illustration of such means is not necessary in order to understand the present invention and enable one of ordinary skill in the art to make and use the present invention. For example, the signal applied to port 601 may be generated by the UC1825 High Speed PWM Controller integrated circuit manufactured by Unitrode Integrated Circuits Corporation. The UC1825 Controller compares the voltage of the load, such as load 174 in FIG. 6, against a predetermined target value and varies the duty cycle of its PWM output signal so as to keep the voltage of the load at the target value.

Control means 600 further comprises two two-input NOR gates 620 and 630, an inverter 640, and three delay units 650, 660, and 670. The duty-cycle signal at input port 601 is coupled to an input of NOR gate 620 and, via inverter 640, to an input of NOR gate 630. The output of NOR gate 620 is coupled to the other input of NOR gate 630 via delay unit 660. The output of NOR gate 630 is coupled to the other input of NOR gate 620 via delay unit 650. The output of NOR gate 630 provides the control signal for primary switch means $S_{PR}$ (shown at 540 in FIG. 10 and at 140 in FIG. 6) and the output of NOR gate 620 provides the control signal for first switch means $S_1$ (shown 530 in FIG. 10 and at 130 in FIG. 6). The coupling of NOR gates 620, 630, delay units 650, 660, and inverter 640 in the above described manner comprise means well known in the digital clocking art for generating two non-overlapping clock signals (ports 610 and 611) from a single input clock signal (port 601).

In operation, the signal value at port 610 follows the signal value at input port 601 and the signal value at port 611 follows the inversion of the signal value at input port 601. The signal transition at port 610 from a logic-high level to a logic-low level (falling edge) follows the falling edge transition at input port 601 with substantially no delay. This is because the output of delay unit 660 is at a logic-low level prior to this transition, thus allowing the output signal from inverter 640 to determine the output of NOR gate 630. The signal transition at port 610 from a logic-low level to a logic-high level (rising edge) follows the rising edge transition at input port 601 with a delay substantially determined by delay unit 660 (delay unit 2). This is because both input signals to NOR gate 630 are both at logic-high levels just prior to the rising edge transition at port 601 and both inputs of NOR gate 630 must be at logic-low levels to cause a rising edge transition at port 610, with the last input of NOR gate 630 being changed to a logic-low level by delay unit 660.

In a complimentary manner, the signal transition at port 611 from a logic-high level to a logic-low level (falling edge) follows the rising edge transition at input port 601 with substantially no delay. This is because the output of delay unit 650 is at a logic-low level prior to this transition, thus allowing the signal at input port 601 to determined the output of NOR gate 620. The signal transition at port 611 from a logic-low level to a logic-high level (rising edge) follows the falling edge transition at input port 601 with a delay substantially determined by delay unit 650 (delay unit 1). This is because both input signals to NOR gate 620 are both at logic-high levels just prior to the falling edge transition at port 601 and both inputs of NOR gate 620 must be at logic-low levels to cause a rising edge transition at port 611, with the last input of NOR gate 620 being changed to a logic-low level by delay unit 650. In this manner, non-overlapping control signals are generated at output ports 610 and 611 with a delay D1 (determined by delay unit 650) occurring between the falling edge of the signal at port 610 and the rising edge of the signal at port 611 and a delay D2 (determined by delay unit 660) occurring between the falling edge of the signal at port 611 and the rising edge of the signal at port 610. In this manner, fixed delays can be introduced between the closing and opening of primary switch means 540 (or 140) and first switch means 530 (or 130).

It may be appreciated that port 601 comprises means for receiving a PWM duty cycle signal generated by standard control means in the switching power supply art. It may be further appreciated that NOR gates 620, 630, delay units 650,660, and inverter 640 comprise means, responsive to the received duty cycle signal, for generating a first control signal at port 610 which directs the operation of the primary switch means and a second control signal at port 611 which directs the operation of the first switch means. It may be further appreciated that each of the first and second control signals have a first state (logic-high level) indicating that its respective switch means is to be closed and a second state (logic-low level) indicating that its respective switch means is to be open. Furthermore, the first and second control signals are generated such that only one of the control signal is in the first state (logic-high level) and are referred to as "non-overlapping" signals.

For generating the control signal for second switch means $S_2$ shown at 550 in FIG. 10 (or at 150 in FIG. 6), control means 600 further comprises a delay unit 670 coupled between the output of NOR gate 630 and output port 612. The control signal for primary switch means $S_{PR}$ propagates through delay unit 670, thus generating a control signal for second switch means $S_2$ which follows the control signal for primary switch means $S_{PR}$ and is delay by a fixed amount. In this manner, control means 600 provides a switching sequence similar to sequence 230 shown in FIG. 7.

It may be appreciated that delay unit 670, as coupled to NOR gate 630, comprises means for generating a third control signal at port 612 to direct the operation of second switch means $S_2$. It may be further appreciated that the logic-low level state of the third control signal comprises a first state indicating that second switch means $S_2$ is to be closed (logic-high level) and that the logic-high level state of the third control signal comprises a second state indicating that second switch means $S_2$ is to be opened. Further, the third control signal enters its first state (logic-high level) a predetermined time duration after the first control signal at port 610 enters its first state, and the third control signal at port 612 enters its second state (logic low level) a predetermined time duration after the first control signal at port 610 enters its second state.

It may be appreciated that a number of means for implementing each of the delay units 650, 660 and 670 are well known in the art and may be used for this purpose. As an example, such a delay unit may comprise a first digital inverter having its input as the input of the delay unit and its output coupled to the input of a second digital inverter, the output of the second inverter being the output of the delay unit. The delay introduced by this delay unit would be equal to the sum of the propagation delays of the to digital inverters. Such an exemplary delay unit may further comprise a standard RC delay circuit coupled between the output of the first digital inverter and the input of the second digital inverter for introducing addition delay time, if required.

A further object of the present invention is to provide a switch control means for the second switch means $S_2$ (150 or 550) of the present invention which is autonomous from the switch control means for primary switch means 140 and first switch means 130, shown in FIG. 6, and which regulates the output voltage of the converter to be within a predetermined voltage range around a predetermined target voltage. The autonomous and regulating features of the switch control means for second switch means 150 provides greater manufacturing modularity, simplicity, flexibility, and reliability. Such an exemplary autonomous switch control means, also called secondary-side control means, is shown at 710 in FIG. 12. In addition, an exemplary embodiment of second switch means 150 is shown at 750 in FIG. 12. Secondary-side control means 710 and second switch means 750 are shown in the context of a partial block diagram 700 of forward converter 100, shown in FIG. 6.

The secondary-side regulation of the output voltage at load 174 according to the present invention is accomplished by secondary-side control means 710 in the following manner. As indicated above, the output voltage at load 174 is related to the input voltage and the duty-cycle of primary switch means 140. For example, in the case where transformer T1 has a one-to-one turns ratio and where choke inductor 170 continuously provides current to load 174 throughout the switching cycle, the output voltage is substantially equal to the product of the input voltage and the duty-cycle, neglecting conversion losses. To regulate the output voltage at load 174, secondary-side control means 710 modifies the effective duty cycle apparent to load 174 by its operation of second switch means 750 (or 150) during the ON period of primary switch means 140.

To illustrate this secondary-side regulation, the following example is provided in which the input voltage is 100 V and the desired output voltage is 25 V. A one-to-one turns-ratio is taken for transformer 120 (T1) and the duty-cycle of primary switch means 140 is set to a fixed value of 50%. If second switch means 750 were operated in near synchronization with primary switch means 140, nearly 100% of the ON-period, the output voltage would be approximately 50 V, assuming a non-zero load current (i.e., choke inductor 170 continuously provides current to load 174). The present invention recognizes that the second switch means 750 (or 150) may be operated to modify the effective duty-cycle seen by load 174 by closing switch means 750 for 50% of the ON-period of primary switch means 140 rather than nearly 100% of the ON-period. Thus, the effective duty-cycle seen by the load would be the product of the fixed 50% duty cycle of primary switch means 140 times the 50% duration that second switch means 750 is closed, the product being equal to 25%. With a 100 V input, the effective 25% duty-cycle thereby provides the desired 25 V output in this example.

To compensate for changes in input voltage level and load current requirements, secondary-side control means 710 comprises means for monitoring the output voltage with respect to a target value and for modifying the duration that second switch means 750 is closed during the ON-period of primary switch means 140. In a preferred embodiment of secondary-side control means 710, the 'closed' duration for second switch means 750 is increased as the output voltage drops below its target value. Likewise, the 'closed' duration for second switch means 750 is decreased as the output voltage rises above its target value. Secondary-side control means 710 may operate in an environment where the duty-cycle of primary switch means 140 is fixed, as detailed in the above example, and may also operate in an environment where the duty-cycle of primary switch means 140 is variable. An example of the latter environment is a power converter which provides two or more isolated output voltage supplies from the primary circuit. In this example, the multiple-output converter would comprise a power transformer 120 having multiple secondary windings and corresponding multiple secondary circuits. Additionally, the duty-cycle of the primary switch may be used to regulate one of the outputs, whereas an embodiment of secondary-side control means 710 may be used to regulate each remaining secondary output voltage (e.g., for a total of three secondary outputs, two embodiments of control means 710 may be used).

Secondary-side control means 710 includes two ports 711 and 712 coupled to respective terminals of secondary winding 124 for receiving an indication of the voltage polarity of winding 124, and two ports 713 and 714 coupled to the output load 174 for receiving an indication of the converter's output voltage. Secondary-side control means 710 further includes ports 715 and 716 coupled to second switching means 750 for providing a switch control signal $S_{SC}$ thereto. Additionally, secondary-side control means 710 comprises a ramp generation means 720 responsive to the voltage polarity of secondary winding 124 for generating a timing ramp signal $S_R$ during the converter's ON-period, and an output detection means 760 responsive to the output voltage for generating an output monitor signal $S_{OM}$ as a function of the output voltage. The value of the output monitor signal $S_{OM}$ is compared to the ramp signal $S_R$ to determined the amount of time that second switch means 750 is to stay closed. For this comparison, secondary-side control means 710 further comprises a comparison control means 780 for comparing signals $S_R$ and $S_{OM}$ and for generating switch control signal $S_{SC}$ in response thereto. The switch control signal $S_{SC}$ comprises a first state for directing the second switch means 750 to close and a second state for directing the second switch means 750 to open.

As indicated above, secondary-side control means 710 modifies the effective duty cycle apparent to load 174 by its operation of second switch means 750 so as to regulate the output voltage at load 174. Second switch means 750 is closed by control signal $S_{SC}$ at a point in time on or after primary switch means 140 closes to start the ON-period and is opened by control signal $S_{SC}$ at a point in time on or before first switch means 130 closes to start the converter's OFF-period. Stated another way, second switch means 750 is closed by control signal $S_{SC}$ no earlier than when primary switch means 140 closes and is opened no later than when first switch means 130 closes. As indicated above with reference to FIG. 7, the time interval from the closing of primary switch means 140 to the closing of first switch means 130 specifies a time window in which second switch means 150, and therefore switch means 750, may be in its closed state in order to ensure zero-voltage switching on primary switch means 140. The duration that second switch means 750 is closed within this time window is modulated to regulate the output voltage at load 174. In a preferred embodiment of the present invention, ramp signal $S_R$, output monitor signal $S_{OM}$, and the switch control signal $S_{SC}$ are generated such that second switch means 750 is in its closed state only within this above described time window.

In one embodiment of control means 710, switch control signal $S_{SC}$ causes second switch means 750 to close (first state) substantially when the converter's ON period begins, and causes second switch means 750 to open (second state) substantially when the ramp signal $S_R$ reaches a value equal to the value of the output monitor signal $S_{OM}$ or when the converter's OFF-period begins, whichever occurs first. In another embodiment of control means 710, switch control signal $S_{SC}$ causes second switch means 750 to close (first state) substantially when the ramp signal $S_R$ reaches a value equal to the value of the output monitor signal $S_{OM}$, and causes second switch means 750 to open (second state) substantially when the converter's OFF-period begins. Each of these embodiments are discussed below in greater detail with reference to two respective timing diagrams 900 and 930, shown in FIGS. 14A and 14B, respectively.

Ramp generation means 720 includes ports 721 and 722 coupled to ports 711 and 712, respectively, for coupling the voltage of secondary winding 124 to ramp generation means 720. Additionally, ramp generation means 720 comprises means for detecting polarity changes in the voltage of secondary winding 124, which occur when the converter switches between its ON- and OFF-periods. The secondary winding voltage has a first polarity when current in secondary winding 124 is to be coupled, or directed, to load 174 and a second polarity when current in secondary winding 124 is not to be coupled, or not to be directed, to load 174. Preferably, the first polarity comprises a positive voltage across secondary winding 124 and the second polarity comprises a negative voltage across secondary winding 124. The secondary winding voltage $V_S$ is shown as a function of time in a graph 902 in FIG. 14A, where the first and second polarities are indicated. The switch state of primary switch means 140 is also shown in FIG. 14A at a graph 901. As can be seen by comparing graphs 901 and 902, primary switch means 140 is closed during the first polarity of voltage $V_S$ is open during the second polarity of voltage $V_S$.

In response to monitoring the voltage of secondary winding 124 and polarities thereof, ramp generation means 720 generates ramp signal $S_R$ at a port 723. Ramp signal $S_R$ is coupled to an input port 781 of comparison control means 780, where it is used to generate switch control signal $S_{SC}$, as discussed below in greater detail. Ramp signal $S_R$ begins ramping from a first value level towards a second value level substantially when the voltage across secondary winding 124 changes from its second polarity to its first polarity. A short time duration later, the convert's ON period begins with the closing of primary switch means 140. The ramp signal $S_R$ ramps in value towards its second value level for at least a predetermined time duration while the voltage across secondary winding 124 remains at its first polarity. Depending upon the value of the duty cycle, the ramp signal $S_R$ may reach the second value level while the voltage across secondary winding 124 is in its first polarity, in which case the ramp signal $S_R$ remains at the second value level for the duration that the secondary winding voltage remains in its first polarity. Ramp signal $S_R$ may then return to its first level at the end of the converter's ON-period or at the end of the converter's OFF period, in preparation for the next ON-period.

Output detection means 760 includes ports 761 and 762 coupled to ports 713 and 714, respectively, for coupling the output voltage of the converter to output detection means 760. Output detection means 760 generates output signal $S_{OM}$ at a port 763, the output signal $S_{OM}$ having a value which is preferably a monotonic function of the monitored output voltage coupled to ports 761 and 762. The output signal $S_{OM}$ may be in the form of a voltage or a current. The output signal $S_{OM}$ is coupled to an input port 782 of comparison control means 780, where it is used to generate the switch control signal $S_{SC}$, as discussed below in greater detail. Depending upon the format of ramp signal $S_R$, output signal $S_{OM}$ may be proportionally related to the converter's output voltage or may by inversely related to the converter's output voltage.

As indicated above, comparison control means 780 includes ports 781 and 782 coupled to ports 723 and 763, respectively, for receiving ramp signal $S_R$ and output monitor signal $S_{OM}$, respectively. Comparison control means 780 further includes two output ports 783 and 784 coupled to ports 715 and 716, respectively, for providing switch control signal $S_{SC}$ to second switch means 750. Additionally, comparison control means 780 comprises means for comparing ramp signal $S_R$ and output monitor signal $S_{OM}$ during the converter's ON-period when the voltage of the secondary winding has the second polarity, and for generating switch control signal $S_{SC}$ as a function of the difference between ramp signal $S_R$ and the output monitor signal $S_{OM}$. With the comparison of these signals, control means 780 generates control signal $S_{SC}$ so as to modulate the time duration second switch means 750 is closed during the converter's ON period. This time duration is a function of the output monitor signal $S_{OM}$ provided to port 782 and varies to regulate the output voltage to be within a predetermined range around a predetermined target value.

Preferably, ramp signal $S_R$ is generated such that switch control signal $S_{SC}$ is in its second state during the converter's OFF-period, thereby ensuring that second switching means 750 is open during the OFF-period. Further, before switching to its first state to direct second switch means 750 to close, switch control signal $S_{SC}$ remains in its second state to keep second switch means 750 open until primary switch means 140 closes. This ensures that the secondary circuit does not load the primary circuit during the zero-voltage switching period of primary switch means 140, shown in FIG. 6. In this way, ramp signal $S_R$, output monitor signal $S_{OM}$, and control means 780 generate switch control signal $S_{SC}$ such that zero-voltage switching is ensured on primary switch means 140 and such that the output voltage is regulated to be within a predetermined value range around a predetermine target value.

In one embodiment of secondary side control means 710, ramp signal $S_R$ ramps from a first value level down to a second value level during the converter's ON-period (while the voltage $V_S$ across secondary winding 124 is in its first polarity). The ramp signal for this embodiment is designated as $S_R{}^1$ and is shown as a function of time at a graph 903 in FIG. 14A. The first and second value levels of $S_R{}^1$ are labeled as '(a1)' and '(b1)', respectively. (As indicated above, the voltage $V_S$ is shown as a function of time in graph 902.) Also in this embodiment, the value of the output monitor signal $S_{OM}$ is inversely related to the voltage at load 174, increasing when the voltage at load 174 decreases and decreasing when the voltage at load 174 increases. The output monitor signal for this embodiment is designated as $S_{OM}{}^1$, and is shown as a function of time in a graph 903 in FIG. 14A. These signals are provided to comparison control means 780, which generates a corresponding switch control signal $S_{SC}{}^1$, which is shown as a function of time in a graph 904 of FIG. 14A. The first and second states of switch control signal $S_{SC}{}^1$ are labeled in graph 904, along with the corresponding designations 'CLOSED' and 'OPEN', respectively, to indicate the intended state of the secondary switch means.

Referring to graphs 902 and 903, ramp signal $S_R{}^1$ enters (i.e., retraces to) its first value level (a1) substantially when voltage $V_S$ changes from its first polarity to its second polarity, as indicated at 911, and remains in its first value level while the voltage $V_S$ remains in its secondary polarity. When voltage $V_S$ changes from its second polarity to its first polarity, as indicated at 912, ramp signal $S_R{}^1$ starts ramping in value from its first value level (a1) towards its second value level (b1). Ramp signal $S_R{}^1$ continues to ramp in value towards its second value level (b1) for at least a predetermined time duration while voltage $V_S$ in its first polarity. This is shown at 914 in graph 903. As indicated above, comparison control means 780 comprises means for comparing both the ramp signal ($S_R{}^1$) and the output monitor signal ($S_{OM}{}^1$) and, in response, for generating the switch control signal ($S_{SC}{}^1$) as a function of the difference in value of these two signals. The first state ('CLOSED') for control signal $S_{SC}{}^1$ is generated when $S_R{}^1$ is less than $S_{OM}{}^1$ and the second state ('OPEN') for control signal $S_{SC}{}^1$ is generated when $S_R{}^1$ is greater than $S_{OM}{}^1$. In graph 903, the points in time when the signals $S_R{}^1$ and $S_{OM}{}^1$ are equal are designated by reference numerals 916 and 918. As seen by comparing graphs 903 and 904, control signal $S_{SC}{}^1$ enters its first state ('CLOSED') and remains therein when $S_R{}^1$ is less than $S_{OM}{}^1$ between points 916 and 918.

As can be seen at 920 in graph 904, there is a delay between the secondary voltage $V_S$ entering its first polarity at point 912 and the closing of second switch means 750 by control signal $S_{SC}{}^1$ at point 916. This is because the value of signal $S_{OM}{}^1$ is less than the first value level (a1) of ramp signal $S_R{}^1$ and because of delay incurred in signal $S_R{}^1$ ramping down (decreasing) to the value of signal $S_{OM}{}^1$. Delay 920 comprises a first portion 921 and a second portion 922. The end of first delay portion 921 and the beginning of second delay portion 922 is shown at a line 923 in FIG. 14A. First portion 921 preferably has a predetermined time duration and is to ensure that the secondary circuit does not load transformer T1 during the zero-voltage switching condition on primary switch means 140, shown in FIG. 6. Second delay portion 922 varies in response to the regulation of the output voltage. First delay portion 921 is the time duration between point 912 and line 923 and is inversely related to the duty-cycle value, decreasing as the duty cycle increases and vice versa. This is because first delay portion 921 is inversely related to the level of magnetizing current built up in the power transformer during the ON period and because the magnetizing current is related to the duty cycle. The duration of delay portion 921 may be measured empirically or may be calculated knowing the value of magnetizing current flowing in transformer 120 at the end of the OFF period and the capacitance of parasitic capacitor 132.

To provide delay portion 921 in the preferred embodiment of the present invention, output monitor signal $S_{OM}{}^1$ is limited to a maximum value which is equal to the value of ramp signal $S_R{}^1$ at time line 923, which is the end of first delay portion 921. This maximum value is shown at 925 in graph 903. As such, ramp signal $S_R{}^1$ is greater than the output monitor signal $S_{OM}{}^1$ during the first portion as it ramps from its first value level (a1) towards its second value level (b1). because control signal $S_{SC}{}^1$ does not enter its first ("CLOSED") state until $S_R{}^1$ is less than $S_{OM}{}^1$, second switch means 750 remains open during first delay portion 921. Given the slope characteristics of ramp signal $S_R$, the duration of delay portion 921, and the value of the first value level (a1) of $S_R$, the maximum value for $S_{OM1}$ may be readily determined by mathematical techniques well known in the art.

In this embodiment of secondary-side control means 710, the regulation of the output voltage at load 174 is accomplished in the following manner. As stated above, the output voltage is regulated to be within a predetermined value range around a predetermine target value, or nominal value, and the output voltage at load 174 is related to the input voltage times the effective duty-cycle seen by load 174. The effective duty cycle is determined by the duty cycle of primary switch means 140 and the duration second switch means 750 is closed during the ON-period of primary switch means 140. The 'CLOSED' duration of second switch means 750 is modified to bring the output voltage to the target value in the following manner. For a given nominal input voltage and a given set of converter component values, there is a nominal effective duty-cycle at which the output voltage at load 174 is equal to the target value. Under steady-state operation at the nominal input voltage and at the target output voltage, the value of output monitor signal $S_{OM}^1$ is at a corresponding nominal value in relation to ramp signal $S_R^1$ such that the effective duty-cycle is provided by switch control signal $S_{SC}^1$.

If the output voltage decreases from its target value, the effective duty-cycle must be increased from its nominal value to provide more power to load 174. In response to a decrease in output voltage, $S_{OM}^1$ increases from its nominal value since it is inversely related to the output voltage. The increase in the value of $S_{OM}^1$ in relation to the ramp signal $S_R^1$ causes the duration of the CLOSED state for control signal $S_{SC}^1$ to increase. This is because the first intercept point 916 (see graph 903) occurs earlier in time than it would under steady-state conditions. Although the second intercept point 918 would also occur later in time than it would under steady-state conditions since $S_{OM}^1$ is greater than its nominal value, this is of much less importance because of the slope of the signal $S_{R1}$ is much steeper at this point than at 910. The CLOSED duration is thereby increase in response to a decrease in output voltage from its target value.

In a similar manner, if the output voltage increases from its target value, the effective duty-cycle must be decreased from its nominal value to provide less power to load 174. In response to an increase in output voltage, $S_{OM}^1$ decreases from its nominal value since it is inversely related to the output voltage. The decrease in the value of $S_{OM}^1$ in relation to the ramp signal $S_R^1$ causes the duration of the CLOSED state for control signal $S_{SC}^1$ to decrease. This is because the first intercept point 916 occurs later in time (see graph 903) since $S_{OM}^1$ is less than its nominal value. Although the second intercept point 918 would also occur earlier in time, the effect of this latter variation is of much less importance. The CLOSED duration is thereby decreased in response to an increase in output voltage from its target value.

In this embodiment, the first state ("CLOSED") of control signal $S_{SC}^1$ occurs between intercept points 916 and 918. In view of the present disclosure, it may be appreciated that, as an equivalent, the first state of control signal $S_{SC}^1$ may occur between line 923 and first intercept point 916. This may be accomplished by generating the first state ('CLOSED') for control signal $S_{SC}^1$ when $S_R^1$ is less than $S_{OM}^1$, by generating the second state ('OPEN') when $S_R^1$ is greater than $S_{OM}^1$, and by generated the output monitor signal $S_{OM}^1$ to be proportionally related to the output voltage. Additionally, means may be included to provide first delay portion 921. Such means may be provided by having the ramp signal $S_R^1$ be in its second value level (b1) during the OFF period of the converter and causing the ramp signal $S_R^1$ to retrace to its first value level (a1) when the secondary voltage $V_S$ changes from its second polarity to its first polarity at point 912.

In another embodiment of secondary side control means 710, ramp signal $S_R$ ramps from its first value level up to (increases to) its second value level during the converter's ON-period (while the voltage $V_S$ across secondary winding 124 is in its first polarity). The ramp signal for this embodiment is designated as $S_R^2$ and is shown as a function of time in FIG. 14B at a graph 933. The first and second values levels of $S_R^2$ are labeled as '(a2)' and '(b2)', respectively. Also in FIG. 14B, the state of the primary switch means 140 is shown as a function of time in a graph 931 of timing diagram 930 and the voltage $V_S$ is shown as a function of time in a graph 932 of timing diagram 930. Graphs 931 and 932 are replicas of graphs 901 and 902, respectively, shown in FIG. 14A. Additionally, the designations for points 911 and 912 for $V_S$ in FIG. 14A have been replicated in FIG. 14B.

Also in this embodiment, the value of output monitor signal is inversely related to the voltage at load 174, increasing when the voltage at load 174 decreases and decreasing when the voltage at load 174 increases. The output monitor signal for this embodiment is designated as $S_{OM}^2$, and is shown as a function of time in graph 933 in FIG. 14B. These signals are provided to comparison control means 780, which generates a corresponding switch control signal $S_{SC}^2$, which is shown as a function of time in a graph 934 of FIG. 14B. The first and second states of switch control signal $S_{SC}^2$ are labeled in graph 934, along with the corresponding designations 'CLOSED' and 'OPEN', respectively, to indicate the intended state of the secondary switch means.

Referring to graphs 932 and 933, ramp signal $S_R^2$ goes to (i.e., retraces to) its first value level (a2) substantially when voltage $V_S$ changes from its second polarity to its first polarity at the beginning of the ON-period, indicated at 912 in graph 932. Once at its first value level (a2), ramp signal $S_R^2$ begins ramping in value from this first value level (a2) towards its second value level (b2). Ramp signal $S_R^2$ continues to ramp in value towards its second value level (b2) while voltage $V_S$ is in its first polarity. This is shown at 944 in graph 933. At the end of the ON-period when the voltage $V_S$ next changes from its first polarity to its second polarity (indicated at 911 in graph 932), ramp signal $S_R^2$ remains in its second value level (b2) until the beginning of the next ON-period. As indicated above, comparison control means 780 comprises means for comparing both ramp signal $S_R^2$ and output monitor signal $S_{OM}^2$ and, in response thereto, generating the switch control signal $S_{SC}^2$ as a function of the difference in value of these two signals. The first state ('CLOSED') for control signal $S_{SC}^2$ is generated when $S_R^2$ is less than $S_{OM}^2$ and the second state ('OPEN') for control signal $S_{SC}^2$ is generated when $S_R^2$ is greater than $S_{OM}^2$. In graph 933, the points in time when the signals $S_R^2$ and $S_{OM}^2$ are equal are designated by reference numerals 946 and 948. As seen by comparing graphs 933 and 934, control signal $S_{SC}^2$ enters its first state ('CLOSED') and remains therein when $S_R^2$ is less than $S_{OM}^2$ between points 946 and 948.

As can be seen graph 934, there is a delay between when the secondary voltage $V_S$ enters its first polarity at point 912 and the closing of second switch means 750 by control signal $S_{SC}^2$ at point 946. This is due to the finite time for ramp signal $S_R^2$ to retrace to its first state (a2). This delay is chosen to ensure that the secondary circuit does not load transformer T1 during the zero-voltage switching condition on primary switch means 140. It may be appreciated that a predetermined fixed delay may be introduced between the beginning of the ON-period and the retrace of ramp signal $S_R^2$.

In this embodiment of secondary-side control means 710, the 'CLOSED' duration of second switch means 750 is modified to bring the output voltage to the target value in the following manner. As with the embodiment described previously, there is a nominal value for output monitor signal $S_{OM}^2$, which corresponds to the effective duty-cycle at which the output voltage at load 174 is equal to its target value. When the output voltage decreases from its target value, the effective duty-cycle must be increased from its nominal value to provide more power to load 174. In response to a decrease in output voltage, $S_{OM}^2$ increases from its nominal value since it is inversely related to the output voltage. The increase in the value of $S_{OM}^2$ in relation to the ramp signal $S_R^2$ causes the duration of the CLOSED state for control signal $S_{SC}^2$ to increase. This is because the second intercept point 948 (see graph 933) occurs later in time than it would when the output voltage is at its target value since $S_{OM}^2$ is greater than its nominal value. The CLOSED duration is thereby increase in response to a decrease in output voltage from its target value.

In a similar manner, if the output voltage increases from its target value, the effective duty-cycle must be decreased from its nominal value to provide less power to load 174. In this case, monitor signal $S_{OM}^2$ decreases from its nominal value (since it is inversely related to the output voltage), which causes second intercept point 948 to occur earlier in time. This reduces the CLOSED duration of second switch means 750 (or 150), thereby reducing the effective duty-cycle.

In this embodiment, the first state ("CLOSED") of control signal $S_{SC}^2$ occurs between intercept points 946 and 948. In view of the present disclosure, it may be appreciated that, as an equivalent, the first state of control signal $S_{SC}^2$ may occur between the second intercept point 948 and line 923. This may be accomplished by generating the first state ('CLOSED') for control signal $S_{SC}^2$ when $S_R^2$ is greater than $S_{OM}^2$, by generating the second ('OPEN') when $S_R^2$ is less than $S_{OM}^2$, and by generated the output monitor signal $S_{OM}^1$ to be proportionally related to the output voltage.

Below, exemplary embodiments of ramp generation means 720, output detection means 760, and comparison control means 780 are discussed. Before discussing these exemplary embodiments, however, the switch means 750 shown in FIG. 12 is briefly discussed in greater detail. Second switch means 750 comprises an n-channel enhancement-type field effect transistor 752 having a gate terminal, a drain terminal connected to secondary winding 124, and a source terminal coupled to node $V_2$. In the preferred embodiment of secondary-side switch control means 710, control signal $S_{SC}$ provides a positive gate-to-source voltage to transistor 752, or alternatively directs current into the gate of transistor 752, when control signal $S_{SC}$ is in its first state, such that transistor 752 conducts current between its drain and source terminals. Likewise, control signal $S_{SC}$ provides a negative or near zero gate-to-source voltage to transistor 752, or alternatively draws current from the gate of transistor 752, when control signal $S_{SC}$ is in its second state, such that transistor 752 is rendered non-conductive. As described below with reference to FIG. 13, an exemplary embodiment of control means 710 may comprise a coupling transformer for providing the voltage level translation between the gate-to-source terminals of transistor 752 and the voltage levels within secondary-side control means 710.

In second switch means 750, field-effect transistor 752 may further include a parasitic substrate diode, as indicated at 754 in FIG. 12. The inclusion of parasitic substrate diode 754 depends upon the particular transistor component used for transistor 752. If parasitic substrate diode 754 exists as part of field effect transistor 752, an undesired current will be conducted from the source terminal to the drain terminal when a negative drain-to-source voltage is applied across transistor 752. To block this undesired current, a blocking rectifier 756 coupled in series between the drain terminal of transistor 752 and secondary winding 124 may be included. As shown in FIG. 12, blocking rectifier 756 is oriented such that current conducted by parasitic substrate diode 754 is prevented from entering secondary winding 124. If transistor 752 does not include parasitic substrate diode 754, blocking rectifier may be removed so as to directly couple the drain of transistor 752 to secondary winding 124.

Exemplary embodiments for ramp generation means 720, output detection means 760, and comparison control means 780 shown in FIG. 12 are shown at 820, 860, and 880, respectively, in FIG. 13. As with secondary-side control means 710, ramp generation means 820, output detection means 860, and comparison control means 880 are shown and discussed in the context of a partial block diagram 700 of forward converter 100, which is shown in FIG. 6. In these exemplary embodiments, the signal-format as shown at graph 903 in FIG. 14A is employed. Specifically, the output monitor signal $S_{OM}$ is inversely related to the output voltage at load 174, and the ramp signal $S_R$ ramps from its first value level down towards its second value level during each ON-period with a retrace at the end of the ON-period back to its first value level. Each of means 820, 860, and 880 is preferably power by a $V_{DD}$ source of approximately 12 V and referenced to the secondary-side ground.

In the embodiments shown in FIG. 13, the output monitor signal $S_{OM}$, the ramp signal $S_R$, and the switch control signal $S_{SC}$ each comprise a voltage signal, and each is referred to below as $V_{OM}$, $V_R$, and $V_{SC}$, respectively. As with the above-discussed ramp signal $S_R$, the ramp voltage signal $V_R$ has a first voltage level and a second voltage level and ramps from its first level to its second level during the ON-period of primary switch means 140. As with the above-discussed output monitor signal $S_{OM}$, the output monitor signal $V_{OM}$ comprises a nominal value corresponding to the nominal value of the output voltage. As with switch control signal $S_{SC}$, switch control signal $V_{SC}$ comprises a first state for directing second switch means 750 to close and a second state for directing second switch means 750 to open.

Ramp generation means 820 includes ports 821–823, which correspond in function to ports 721–723 of ramp generation means 720 shown in FIG. 12. Ports 821 and 822 are coupled to secondary winding 124 for coupling the secondary winding voltage $V_S$ to ramp generation means 820. At port 823, ramp generation means 820 provides ramp signal $V_R$ to comparison control means 880. For generating the ramp signal $V_R$, ramp generation means 820 comprises a capacitor 834 and a modulation means, which includes an amplifier means 830, a rectifier 832, and a resistor 836. The ramp signal $V_R$ is generated as a voltage across capacitor 834, which is coupled between ground and port 823. The modulation means selectively charges and discharges capacitor 823 in response to the changes in the polarity of voltage $V_S$ to provide the above-described ramp signal ($S_R$) shown in graph 903. Specifically, the modulation means provides means for charging capacitor 834 at a first rate when the secondary winding voltage $V_S$ is in its second polarity (negative) and for discharging capacitor 834 at a second rate when the secondary winding voltage $V_S$ is in its first polarity (positive).

The first and second rates are chosen to provide the retrace and ramp portions of ramp signal $V_R$. In the embodiment shown in FIG. 13, the first rate (charging) is faster than the second rate (discharging). The first rate is associated with the retrace portion of ramp signal $V_R$ and the second rate is associated with the ramp portion of the ramp signal $V_R$. Also in this embodiment of ramp generation means 820, the first voltage level of ramp signal $V_R$ is greater than its second voltage level. Further, means are included in ramp generation means 820 to limit the charging of capacitor 834 such that the value of ramp signal $V_R$ does not exceed its first voltage level and to limit the discharging of capacitor 834 such that the value of ramp signal $V_R$ does not decrease below its second voltage level.

To detect the polarity changes in secondary winding voltage $V_S$, the modulation means of ramp generation means 820 further includes a series combination of a resistor 826 and a Zener diode 828, which are coupled to one another at a node 827. In a preferred embodiment of ramp generation means 820, Zener diode 828 has a reverse breakdown (zener breakdown) voltage of 5.8 volts and the series combination of resistor 826 and Zener diode 828 are coupled to secondary winding 124 such that a positive voltage of approximately 5.8 volts is generated at node 827 when secondary winding voltage $V_S$ is in its first polarity (positive) and such that a slightly negative voltage of approximately $-0.6$ volts is generated at node 827 when secondary winding voltage $V_S$ is in its second polarity (negative). The anode terminal of Zener diode 828 is coupled to port 821, which is coupled to ground and the cathode terminal of Zener diode 828 is coupled to node 827. Resistor 826 is coupled between node 827 and port 822. Also in a preferred embodiment of ramp generation means 820, a catch rectifier 829 is coupled in parallel with Zener diode 828 to better limit the negative excursion of voltage $V_{827}$. The anode terminal of rectifier 829 is connected to the anode terminal of Zener diode 828 and the cathode terminal is connected to the cathode terminal of Zener diode 828.

In the modulation means of ramp generation means 820, amplifier means 830 is for providing a charging current, and rectifier 832 is for selectively coupling the charging current to capacitor 834 in response to the detected polarity changes in voltage $V_S$. Additionally, resistor 836 is for selectively discharging capacitor 834, also in response to the detected polarity changes in voltage $V_S$. The secondary winding voltage $V_S$ is shown as a function of time in a timing diagram 950 in FIG. 15. The voltage $V_S$ is shown in a timing graph 951 along with designations for its first and second polarities. Amplifier means 830 is responsive to the detected polarity changes in $V_S$ and includes an input coupled to node 827 and an output coupled to a node 831. Rectifier 832 is coupled between the output of amplifier means 830 and capacitor 834 and allows amplifier means 830 to provide a charging current to capacitor 834 when the output voltage of amplifier means 830 is greater than voltage across capacitor 834 (i.e., the voltage at port 823). Resistor 836 is coupled in parallel with capacitor 834 to provide a discharge path when capacitor 834 is not being charged by amplifier means 830.

Amplifier means 830 has a high input-impedance at its input so as to not load node 827 and a relatively low output-impedance at its output so as to provide good voltage and current drive capability to node 831. Amplifier means 830 generates a 'buffered' version of $V_{827}$ at node 831, which is inverted from that at node 827 (inversely related). The voltage at node 831 is referred to as $V_{831}$ and is shown at a graph 952 in FIG. 15. Amplifier means 830 is powered between $V_{DD}$ and ground and, as such, the output of amplifier means 830 has an upper value limit of approximately $V_{DD}$ and a lower value limit of approximately 0 volts. The upper and lower limits are the first and second value levels of ramp signal $V_R$, respectively, and as such, amplifier means 830 comprises means for limiting the above-mentioned charging and discharging capacitor 834. In the preferred embodiments of ramp generation means, amplifier means 830 comprises a digital inverter, which typically has a switching gain in the range of 10–20. However, it may be appreciated that a properly compensated operational amplifier may be used as an equivalent.

The output of amplifier means (node 831) is coupled to capacitor 834 via rectifier 832. The anode terminal of rectifier 832 is coupled to node 831 and the cathode terminal of rectifier 832 is coupled to the terminal of capacitor 834 which provides ramp signal $V_R$ and to port 823. Due to the unidirectional conducting properties of rectifier 832, the above-described coupling of rectifier 832 between the output of amplifier means 830 and capacitor 834 allows charging of capacitor 834 to occur when the voltage at this output (node 831) is in a high voltage state ($\sim V_{DD}$ volts), corresponding to when the voltage $V_S$ is in its second polarity (negative) during the OFF-period. Further, this above-described coupling prevents the discharging of capacitor 834 via amplifier means 830 when the voltage at its output (node 831) is in a low voltage state ($\sim 0$ volts), corresponding to when the voltage $V_S$ is in its first polarity (positive) state during the ON-period. Instead, capacitor 834 is discharged by resistor 836 when the voltage at node 831 is low.

The characteristics of the charging and discharging of capacitor 834 and the voltage across 834 in this embodiment of ramp generation means 820 are as follows. During the initial charging of capacitor 834 in the retrace of voltage $V_R$, the output of amplifier means provides a near constant current to the parallel circuit of capacitor 834 and resistor 836. The value of the near constant current is designated as $I_{OS}$. The voltage across capacitor 834 (ramp signal $V_R$) increases and the waveform of $V_R$ has the shape of the well-known negative-exponential rise-time waveform, due to resistor 836. The ramp voltage $V_R$ is shown at a timing graph 953 in FIG. 15 and the rise-time is shown at reference numeral 961 in graph 953. As the voltage $V_R$ increases in value, for example to 85% of the supply voltage $V_{DD}$, the output terminal of amplifier means 830 no longer provides a near constant current. At this point, the output of amplifier means 830 may be modelled as a voltage source in series with a variable resistance of relatively low resistance with respect to the resistance of resistor 836. The voltage $V_R$ continues to rise towards $V_{DD}$ in the above cited negative-exponential fashion, although at a slower rate, until an equilibrium with the resistance of resistor 836 is reached. This leads to an equilibrium value for voltage $V_R$ during the converter's OFF-period, as shown in graph 953.

During the discharging of capacitor 834 during the converter's ON-period, the output of amplifying means 820 does not supply current to the parallel combination of capacitor 834 and resistor 836. During this time, the voltage across capacitor 834 (ramp signal $V_R$) decreases and the waveform of $V_R$ has the shape of the well-known negative-exponential fall-time waveform, as shown at reference numeral 962 in graph 953 of FIG. 15. As seen in graph 953 and as indicated above, the rise time (charging time) of $V_R$ is faster than its fall time (discharging time). In the embodiment shown in FIG. 13, the resistance value of resistor 836 is chosen in relation to the initial output charging current $I_{OS}$ of amplifier means 830 to provide a rise time at 961 (retrace) which is shorter than the fall time at 962 (ramp portion). Preferably, resistor 836 has a resistance of approximately 10 K ohms, capacitor 834 has a capacitance of approximately 100 pF, and amplifier means 830 has an average charging current of approximately 5 mA. With these values, the ramp signal $V_R$ is generated at port 823 as substantially shown in graph 953 in FIG. 15.

It may be appreciated that other means may be used to provide the ramping function provided by the discharging of capacitor 834 by resistor 836. For example, resistor 836 may be replaced by a constant current source which directs a fixed amount of current into the ground reference from node 835 (port 823) during the ON-period. Such a constant current source may, for example, be constructed from a current mirror circuit comprising a resistor and two transistors, as well known in the analog integrated circuit art.

The exemplary output detection means 860 shown in FIG. 13 is now discussed. Output detection means 860 includes ports 861-863, which correspond in function to ports 761-763 of output detection means 760 shown in FIG. 12. Ports 861 and 862 are coupled to respective terminals of load 174 for monitoring the output voltage. At port 863, output detection means 860 provides output monitor voltage $V_{OM}$ to comparison control means 880. As mentioned above, output detection means 860 generates output monitor voltage $V_{OM}$ as a monotonic function of the output voltage at load 174. The voltage $V_{OM}$ is inversely related to the output voltage, with its value decreasing when the output voltage increases and with its value increasing when the output voltage decreases. Additionally, output monitor means 860 comprises a voltage divider network including three resistors 866, 868, and 869, which are coupled in series. Resistors 866 and 868 are connected in series at a node 867, and resistors 868 and 869 are connected in series at a node 864. The voltage dividing network is coupled across load 174 via ports 861 and 862. The network provides a scaled version of the output voltage at node 867 which is equal to $R_{866}V_{OUT}/(R_{866}+R_1)$, where $R_{866}$ is the resistance of resistor 866 and $R_1$ is the combined resistance of resistors 868 and 869. The values of resistors $R_{866}$ and $R_1$ are chosen such that node 867 has a nominal value of substantially 2.5 V when the output voltage is at its nominal value. In a preferred embodiment of output monitor means 860 in which an output of ~12 volts is generated at load 174, resistor $R_{866}$ has a value of ~2.2 K ohms and resistor $R_1$ has a value of ~8.2 K ohms. The use of the voltage generated at node 867 is discussed below.

Output monitor means 860 further comprises a high-gain amplifier means 870 and a resistor 878. High-gain amplifier means 870 includes a differential amplifier 872 having an inverting input (−), a non-inverting input (+) coupled to node 867, and an output. Amplifier 872 is powered by the $V_{DD}$ supply line. Amplifier means 870 further includes a voltage reference 871 having a positive terminal coupled to the inverting input of differential amplifier 872 and a negative terminal coupled to the ground reference. As such, differential amplifier 872 provides at its output an amplified version of the signal at its non-inverting input. As such, the output of amplifier 872 is related proportionally and monotonically to the converter's output voltage, which is coupled to the non-inverting input of amplifier 872. Amplifier means 870 further includes a transistor 876 having an emitter terminal coupled to the ground reference, a base terminal coupled to the output of differential amplifier 872, and a collector terminal coupled to one terminal of resistor 878. The other terminal of resistor 878 is coupled to the $V_{DD}$ supply. The output monitor signal $V_{OM}$ is provided at the collector terminal of transistor 876, which is also coupled to port 863. Transistor 876 and resistor 878 comprise an inverter which provides an inversion of the signal at the output of amplifier 872 to output port 863 ($V_{OM}$). Because of this inversion and because the output of amplifier is related proportionally and monotonically to the converter's output voltage, the output monitor signal $V_{OM}$ is generated as a monotonic function of the converter's output voltage and is inversely related to the converter's output voltage.

In a preferred embodiment of output monitor means 860, amplifier means 870 is provided by an AS431 Precision Adjustable Shunt Reference manufactured by ASTEC Semiconductor, Inc. In the AS431, voltage reference 871 provides a potential difference of approximately 2.5V and comprises a temperature compensated band-gap reference circuit, which increases the temperature insensitivity of voltage reference 871. Additionally, the AS431 provides a region of high-gain inversion of approximately −560 (55 dB) between its input and output. This region of high-gain is centered around an input voltage of ~2.5 V (at the non-inverting input), which is equal to the value of voltage reference 871. The width of the high gain region is approximately equal to the supply voltage $V_{DD}$ divided by the gain, which is ~10 mV. Outside the high gain region, the inverted function approaches $V_{DD}$ when the input (at the non-inverting input) is less than the reference voltage and approaches zero voltage when the input is greater than the reference voltage.

As is known in the art, a compensation network is generally provided at the non-inverting input and the output of amplifier means 870 to prevent the control loop from unduly oscillating. For output monitor means 860, the compensation network includes a series combination of a capacitor 875 and a resistor 874 coupled between the non-inverting input and output of amplifier means 870, and a capacitor 865 coupled between the non-inverting input of means 870 and node 864. TABLE I lists preferred values for the components of output monitor means 860 and for relevant components of converter 100.

TABLE I

| | |
|---|---|
| Capacitor 865 | 47 nF |
| Resistor 866 | 2.2 K ohms |
| Resistor 868 | 6.8 K ohms |
| Resistor 869 | 1.8 K ohms |
| Resistor 874 | 10 K ohms |
| Capacitor 875 | 47 nF |
| Resistor 878 | 1 K ohm |
| Inductor 170 | 35 uH |
| Capacitor 172 | 1000 uF |
| Rectifiers 756, 160 | Motorola MBR1060 (schottky) |
| Transistor 752 | International Rectifier Corp. IRFZ44 |
| Switching Freq. | 200 Khz |
| Output Voltage | 12 V |

TABLE I-continued

| Output Current | 7 A |
| --- | --- |

Comparison control means 880 includes ports 881–884, which correspond in function to ports 781–784 of comparison control means 780 shown in FIG. 12. Port 881 is coupled to output port 823 of ramp generation means 820 and is for receiving the ramp signal $V_R$. Port 882 is coupled to output port 863 of output monitor means 860 and is for receiving the output monitor signal $V_{OM}$. Ports 883 and 884 are coupled to the gate and source terminals, respectively, of transistor 752 of second switch means 750 and are for providing the switch control signal $V_{SC}$ to second switch means 750. Additionally, comparison control means 880 comprises a differential amplifier means 887 for generating switch control signal $V_{SC}$ as a function of the difference between output monitor signal $V_{OM}$ and ramp signal $V_R$. Amplifier means 887 includes an inverting input coupled to ramp signal $V_R$, a non-inverting input coupled to output monitor signal $V_{OM}$, and an output for providing switch control signal $V_{SC}$.

Comparison control means 880 further comprises an isolation transformer 890 having a primary winding 891 and a secondary winding 892, and a resistor 894. Primary winding 891 has a first terminal coupled to the output of amplifier means 887 and a second terminal coupled to ground. Resistor 894 is coupled in series with secondary winding 892, and the series combination is coupled between the gate and source terminals of transistor 752 through ports 883 and 884. The switch control signal $V_{SC}$ from the output of amplifier means 887 is coupled to primary winding 891, and in turn to transistor 752 through secondary winding 892 and resistor 894. Isolation transformer 890 translates the voltage range of switch control signal $V_{SC}$ to a range which is more usable for transistor 752. The signal generated at the output of amplifier means 887 is referenced with respect to ground ($\sim 0$ V) whereas the voltage of the source terminal of transistor 752 varies between near zero volts and the converter's output voltage during operation. With the above described configuration of transformer 890, the voltage of the switch control signal $V_{SC}$, as referenced from the ground potential, is coupled between the gate and source terminals of transistor 752. As such, the voltage applied to the gate of transistor 752 is referenced with respect to the source terminal of transistor 752, thereby addressing the variation in the source terminal voltage.

As can be seen at in graph 953 shown in FIG. 15, there is a delay in between the secondary voltage $V_S$ entering its first polarity and the closing of second switch means 750 by control signal $V_{SC}$. This is because the value of signal $V_{OM}$ is less than the first value level of ramp signal $V_R$ and because of a delay incurred in signal $V_R$ ramping down to the value of $V_{OM}$. As described above with reference to control means 710 (shown in FIG. 12) and to timing diagram 900 (shown in FIG. 14A), this delay keeps second switch means 750 from closing until primary switch means 140 closes, and thereby enables zero-voltage switching on primary switch means 140. In normal operations, the value of output monitor signal $V_{OM}$ is maintained below the first value level of ramp signal $V_R$ such that second switch means 750 closes on or after primary switch means 140 closes.

While the invention has been described in connection with what is presently considered to be the most practical and preferred embodiments, it is to be understood that the present invention is not limited to the disclosed embodiments but, on the contrary is intended to cover various modifications and equivalent arrangements included within the scope of the appended claims.

What is claimed is:

1. In a converter having a transformer including a primary winding and a secondary winding, said secondary winding coupled to an output load, and having a primary switch means connected in series between said primary winding and a voltage source, said primary switch means causing energy from said voltage source to be stored in said transformer when said primary switch means is closed during an ON period and causing said energy to be released from said transformer when said primary switch means is open during an OFF period, circuitry for utilizing the energy stored in said transformer to reset the core of said transformer during said OFF period of said primary switch means, to minimize the voltage stress on said primary switch means when said primary switch means closes, and to regulate the output voltage at said output load, said circuitry comprising:

a storage capacitor;

a first switch means coupled in series with said storage capacitor, the series combination of said storage capacitor and said first switch means coupled in parallel with one of said transformer windings;

a second switch means coupled in series with said secondary winding of said transformer; and a switch control means for operating said first and second switch means in relation to the operation of said primary switch means, said switch control means closing said first switch substantially when said primary switch means opens and opening said first switch means prior to when said primary switch means closes to create a zero-voltage switching condition on said primary switch means when said primary switch means next is caused to close, said switch control means including a secondary-side control means for controlling said second switch means and for regulating the output voltage of said converter, said secondary-side control means closing said second switch means no earlier than when said primary switch means closes and opening said second switch means before said first switch means closes, said secondary-side control means further for controlling the duration said second switch means is closed such that the value of said output voltage is regulated within a predetermined voltage range.

2. The circuitry of claim 1 wherein the voltage of said secondary winding has a first polarity when current in said secondary winding is to be coupled to said load and a second polarity when current in said secondary winding is not to be coupled to said load and wherein said secondary-side control means comprises:

output detection means for generating an output monitor signal as a function of the output voltage at said load;

ramp generation means responsive to the voltage across said secondary winding for generating a ramp signal during the time said secondary winding voltage is in its first polarity, said ramp signal having a first value level and a second value level, said ramp signal ramping in value from its said first value level towards it second value level; and comparison control means for comparing said ramp signal and said output monitor signal when the voltage of said secondary winding has the second polarity and for generating in response thereto a switch control signal as a function of the difference between said ramp signal and said output monitor signal, said switch control signal having a first state for directing said second switch means to close and a second state for directing said second switch means to open, said comparison control means generating said switch control signal such that the value of said output voltage is regulated to be within a predetermined value range around a predetermined target value.

3. The circuitry of claim 2 wherein said ramp signal enters its first value level substantially when the voltage across said secondary winding changes from its first polarity to its second polarity, and wherein said ramp signal substantially remains at its first value level when the voltage across said secondary winding is in its second polarity.

4. The circuitry of claim 2 wherein the second value level of said ramp signal is less than the first value level of said ramp signal, wherein said output detection means generates said output monitor signal as a monotonic function of said output voltage such that the value of said output monitor signal decreases when said output voltage increases, and increases when said output voltage decreases, said output monitor signal having a nominal value when said output voltage is equal in value to said predetermined target value, and wherein the nominal value of said output monitor signal is less than said first value level and greater than said second value level.

5. The circuitry of claim 4 wherein said ramp signal comprises a voltage and wherein said output monitor signal comprises a voltage.

6. The circuitry of claim 4 wherein said comparison control means comprises a differential amplifier means for generating said switch control signal as a function of the difference between said output monitor signal and said ramp signal, said amplifier means having an inverting input coupled to said ramp signal, a non-inverting input coupled to said output monitor signal, and an output for providing said switch control signal.

7. The circuitry of claim 2 wherein said ramp signal comprises a voltage, wherein said second value level of said ramp signal is less than said first value level of said ramp signal, and wherein said ramp generation means comprises modulation means for charging a first capacitor at a first rate when the voltage of said secondary winding is in said second polarity and for discharging said first capacitor at a second rate when the voltage of said secondary winding is in said first polarity.

8. The circuitry of claim 7 wherein said ramp generation means further comprises means for limiting the potential difference across said first capacitor to an upper value and to a lower value.

9. The circuitry of claim 7 wherein said second rate is smaller than said first rate.

10. The circuitry of claim 9 wherein said modulation means comprises:
a series combination of a first resistor and a Zener diode, said first resistor and said Zener diode coupled at a first node, said series combination coupled across said secondary winding;
an amplifying means having an input coupled to said first node and an output, said amplifying means having a predetermined gain, the voltage at said amplifying means output having a predetermined upper value and a predetermined lower value;
an RC circuit comprising an input coupled to said output of said amplifying means, said first capacitor, a second resistor, a rectifier for creating a difference in said first and second charging rates, and an output coupled to said first capacitor for providing said ramp signal.

11. The circuitry of claim 10 wherein said series combination further comprises a rectifier coupled in parallel with said Zener diode, said rectifier having a anode terminal connected to the anode terminal of said Zener diode and a cathode terminal connected to the cathode terminal of said Zener diode.

12. The circuitry of claim 2 wherein said output detection means generates said output monitor signal as a monotonic function of said output voltage and wherein said output detection means comprises:
a voltage divider having a first resistor coupled in series with a second resistor at a first node, said voltage divider coupled in parallel with said output load to monitor the output voltage of said converter;
a reference potential;
a differential amplifying means for generating an output signal related to the difference of the voltage at said first node and said reference potential, said output monitor signal provided as said output signal of said amplifying means.

13. The circuitry of claim 12 wherein said differential amplifying means comprises:
a differential amplifier having an inverting input coupled to said reference potential, a non-inverting input coupled to said first node, and an output; and
an inverter comprising an input coupled to said output of said differential amplifier, an output for providing said output signal of said differential amplifying means, said inverter comprising a transistor and a third resistor.

* * * * *